US007527196B2

(12) United States Patent
Murofushi et al.

(10) Patent No.: US 7,527,196 B2
(45) Date of Patent: May 5, 2009

(54) COMMODITY SALES REGISTRATION PROCESSING SYSTEM AND COMMODITY INFORMATION REGISTERING APPARATUS

(75) Inventors: Nobuo Murofushi, Susono (JP); Yasuo Matsumoto, Numazu (JP); Kouichi Sano, Ihara (JP); Shigetoshi Kunieda, Kawasaki (JP); Yasuhito Kiji, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 420 days.

(21) Appl. No.: 11/369,925

(22) Filed: Mar. 7, 2006

(65) Prior Publication Data
US 2006/0261161 A1   Nov. 23, 2006

Related U.S. Application Data

(63) Continuation of application No. PCT/JP2005/009383, filed on May 23, 2005.

(51) Int. Cl.
*G06K 15/00* (2006.01)
*G06F 17/00* (2006.01)
*G06F 19/00* (2006.01)

(52) U.S. Cl. .................. 235/383; 235/375; 235/385

(58) Field of Classification Search .............. 235/375, 235/383, 385, 462.45, 462.46, 472.01
See application file for complete search history.

(56) References Cited

U.S. PATENT DOCUMENTS 5,640,002 A * 6/1997 Ruppert et al. ......... 235/462.46
6,634,550 B1   10/2003 Walker et al.
6,879,264 B2 * 4/2005 Hidaka et al. .......... 340/825.19
7,063,263 B2 * 6/2006 Swartz et al. .......... 235/472.02
7,195,157 B2 * 3/2007 Swartz et al. ............. 235/383
7,372,360 B2 * 5/2008 Joseph ................... 340/10.41
2001/0013830 A1   8/2001 Garber et al.
2002/0139617 A1   10/2002 Goodwin, III
2002/0145047 A1   10/2002 Goodwin, III

FOREIGN PATENT DOCUMENTS

EP    0 598 624        5/1994
EP    0 702 324        3/1996
EP    0 724 241 A2     7/1996

(Continued)

OTHER PUBLICATIONS

Search report for counterpart PCT application.

(Continued)

*Primary Examiner*—Thien M. Le
*Assistant Examiner*—April A Taylor
(74) *Attorney, Agent, or Firm*—Harness, Dickey & Pierce, P.L.C.

(57) ABSTRACT

Tag information which has been previously read but is not currently read is retrieved every time tag information is collectively read by a wireless tag reading device. When corresponding tag information is detected, sales information of a commodity is acquired from this tag information, and the acquired sales information is registered in a sales registering section. Further, display contents in a display device are changed in response to detection of the tag information which has been previously read but is not currently read. Furthermore, when information concerning a commodity for sale is input through a barcode reader, sales information of the commodity is acquired from this input information, and the acquired sales information is registered.

15 Claims, 20 Drawing Sheets

FOREIGN PATENT DOCUMENTS

| | | |
|---|---|---|
| EP | 0 953 948 A2 | 11/1999 |
| FR | 2 658 059 | 8/1991 |
| FR | 2 863 082 | 6/2005 |
| JP | 08-124028 | 5/1996 |
| JP | 10-49756 | 2/1998 |
| JP | 11-66435 | 3/1999 |
| JP | 2003-51066 | 2/2003 |
| JP | 2003-067834 | 3/2003 |
| JP | 2003-67834 | 3/2003 |
| JP | 2003-67834 | 7/2003 |
| WO | WO 99/26462 | 6/1999 |
| WO | WO 03/094097 | 11/2003 |

OTHER PUBLICATIONS

English translation of PCT/JP2005/009383.
Communication from European Patent Office regarding counterpart application.
Communication from European Patent Office re: related application.
English translation of International Preliminary Report on Patentability from PCT/JP2005/009383.

* cited by examiner

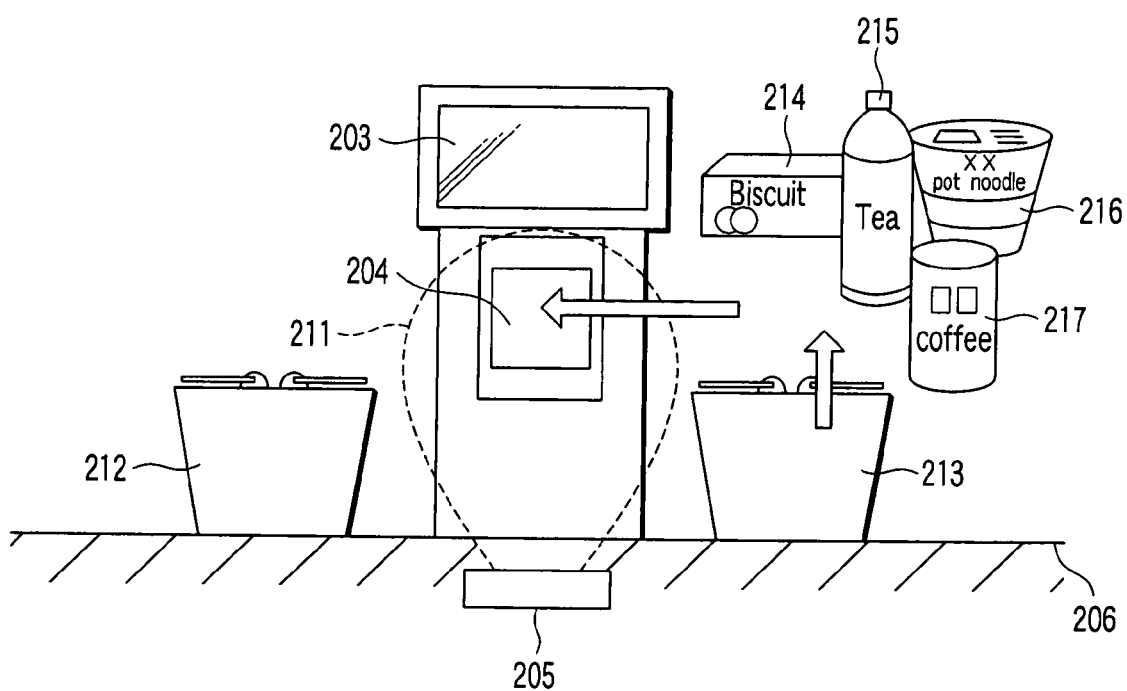
F I G. 25

COMMODITY SALES REGISTRATION PROCESSING SYSTEM AND COMMODITY INFORMATION REGISTERING APPARATUS

CROSS-REFERENCE TO RELATED APPLICATIONS

This is a Continuation Application of PCT Application No. PCT/JP2005/009383, filed May 23, 2005, which was published under PCT Article 21(2) in Japanese.

BACKGROUND OF THE INVENTION

1. Field of the Invention

The present invention relates to a commodity sales registration processing system and a commodity information registering apparatus which read and register a wireless tag or a barcode in which information to specify a commodity is stored in stores.

2. Description of the Related Art

There has been known a cash register as a commodity information registering apparatus provided with a function of reading a barcode or a wireless tag attached to each commodity (see, e.g., Jpn. Pat. Appln. KOKAI Publication No. 66435-1999). In this publication, a data carrier reader reads data carrier information attached to a commodity and inputs identification data, a manufacturing date and other data of this commodity to the cash register. At this time, a total sales price of the commodity is displayed in a display section of the cash register to inform a purchaser.

BRIEF SUMMARY OF THE INVENTION

In caser of reading each commodity by using a barcode like a prior art, a salesperson who performs a reading operation confirms reading based on sound. Further, in the case of simultaneously reading a plurality of commodities by using wireless tags, whether all data has been read cannot be judged. Furthermore, if there are both a commodity whose information can be read and a commodity whose information cannot be read when simultaneously reading a plurality of commodities, it is impossible to be easily aware of information of which commodity cannot be read.

Therefore, when simultaneously reading information of a plurality of commodities, commodity registration takes time.

It is an object of the present invention to provide a commodity sales registration processing system capable of reducing a registration time of each commodity in a commodity information registering apparatus which can simultaneously read information of a plurality of commodities, and a commodity information registering apparatus.

According to an aspect of the present invention, there is provided a commodity sales registration processing system comprising: a sales registering section in which sales information of a commodity is registered; a wireless tag reading device which collectively reads tag information from a wireless tag attached to each of commodities placed in a reading region at fixed intervals; retrieving means for retrieving tag information which has been read in a previous time but is not read in a current time every time the tag information is collectively read by the wireless tag reading device; first commodity sales registration processing means for acquiring sales information of a commodity from corresponding tag information and registering the acquired information in the sales registering section when this tag information is detected by this retrieving means; informing means for performing an informing operation in response to detection of the corresponding tag information by the retrieving means; inputting means for inputting information concerning a commodity for sale; and second commodity sales registration processing means for acquiring sales information of a commodity from the information input through this inputting means and registering the acquired information in the sales registering section.

BRIEF DESCRIPTION OF THE SEVERAL VIEWS OF THE DRAWING

FIG. 25 is a flowchart illustrating a commodity information registering operation in the fourth embodiment.

DETAILED DESCRIPTION OF THE INVENTION

An embodiment according to the present invention will now be described hereinafter with reference to the accompanying drawings.

It is to be noted that this embodiment relates to a commodity sales registration processing system suitable for retail stores where both commodities having wireless tags attached thereto and commodities having no wireless tags attached thereto exist and barcodes are printed on or attached to most of these commodities.

First Embodiment

Figure 1:
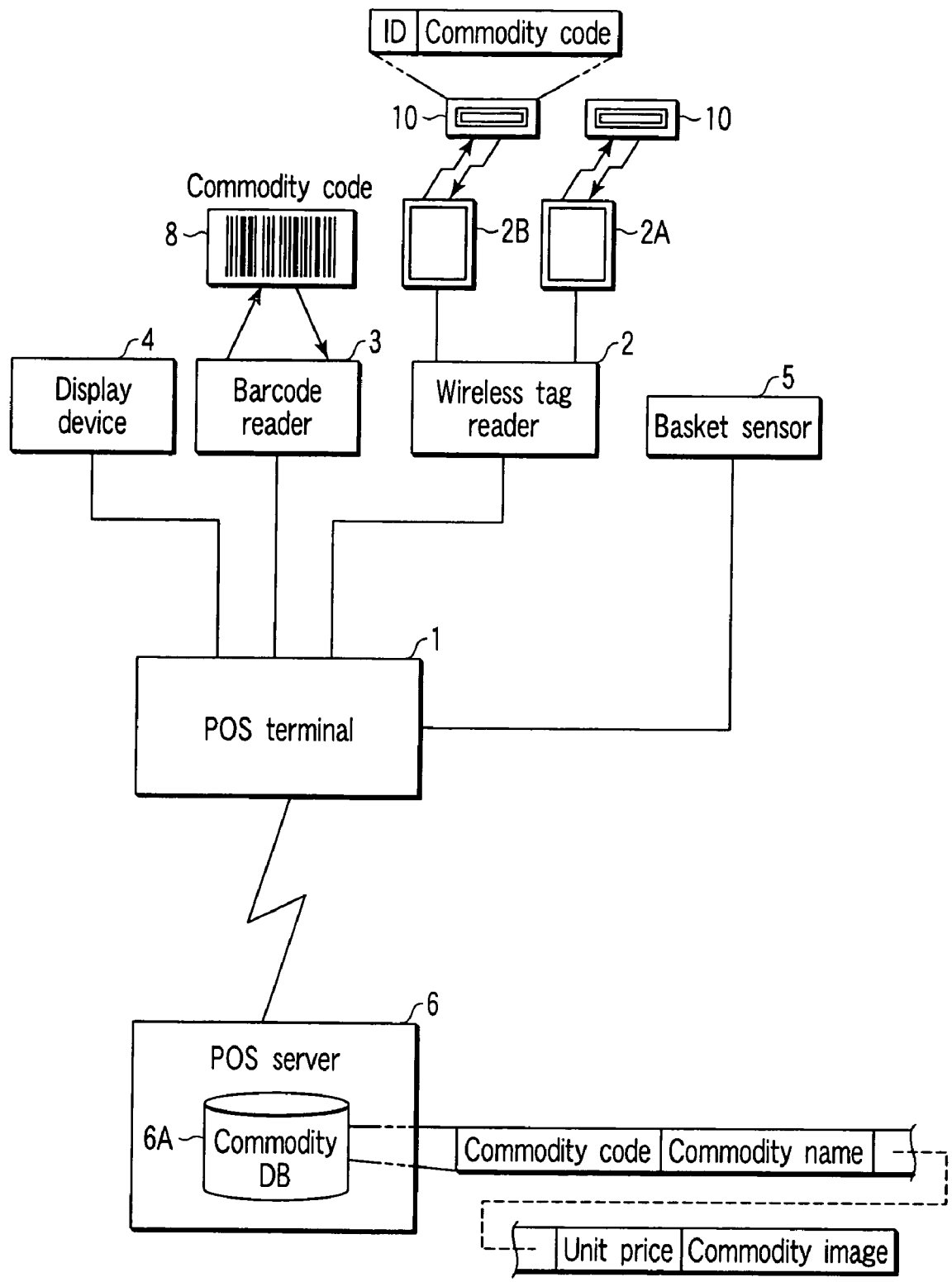
FIG. 1 is a block structural diagram showing a commodity sales registration processing system in a first embodiment.
Figure 2:
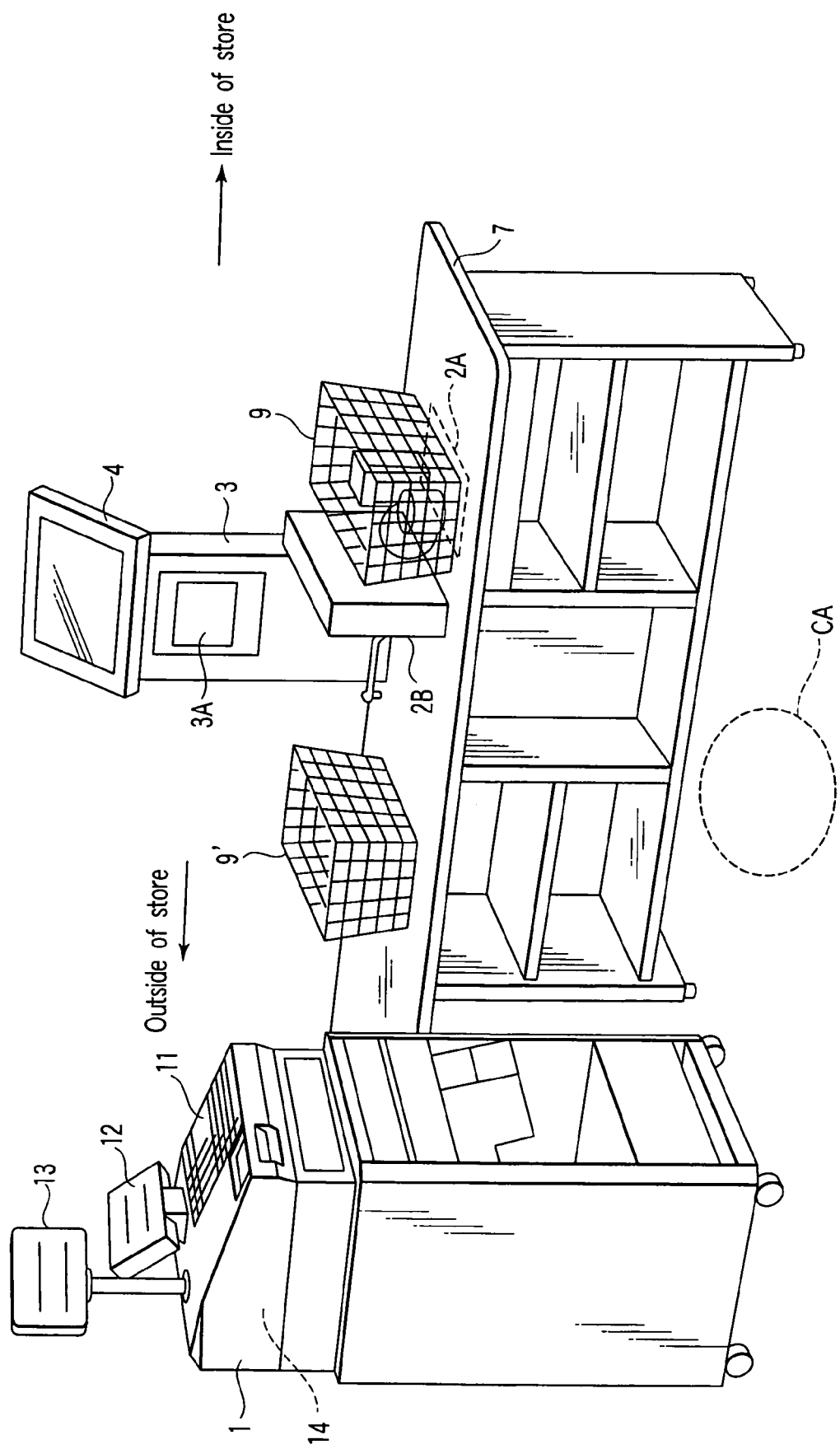
FIG. 2 is a schematic view showing a checkout section of in the first embodiment.

FIG. 1 is a block structural diagram showing a commodity sales registration processing system in a first embodiment, and FIG. 2 is a schematic view showing a checkout section having the commodity sales registration processing system is introduced therein. This system is constituted of a POS terminal 1, a wireless tag reader 2, a barcode reader 3 and a display device 4 and a basket sensor 5 respectively connected with the POS terminal 1 through a communication cable, and a POS server 6 connected with the POS terminal 1 through a network such as an LAN (Local Area Network) or the like.

The POS terminal 1 is installed in a checkout counter 7 to face a cashier CA, and in a case thereof are provided a keyboard 11 on which a settling key which declares end of registration of commodities purchased by one customer and other keys are arranged, and an operator indicator 12 and a customer indicator 13 which indicate a name, a price, a total price and others of each commodity subjected to sales registration. Further, a printer 14 which prints a receipt or the like is provided in the case.

The barcode reader 3 is one type of a barcode reading device which optically reads a barcode 8 attached to each commodity, and substantially vertically erected at a substantially central portion of the checkout counter 7 with a barcode read surface 3A facing the inside of the counter. The barcode 8 includes a commodity code which is previously allocated and set in accordance with each commodity in order to identify a type of each commodity.

The display device 4 displays a name or the like of a commodity subjected to sales registration, and is disposed with its display screen facing the inside of the checkout counter 7 at a top portion of the barcode reader 3. It is to be noted that the position at which the display device 4 is disposed is not restricted to the top portion of the barcode reader 3, and the display device 4 can be provided at any position as long as the cashier CA in the checkout counter 7 can readily confirm the display screen during an operation of registering a commodity for sale.

The wireless tag reader 2 has, a plurality of, i.e., two antennas 2A and 2B in this embodiment and, as shown in FIG. 2, one antenna 2A is embedded in the checkout counter 7 close to the inside of a store apart from the barcode reader 3, whilst the other antenna 2B is erected on the checkout counter 7 in the vicinity of the antenna 2A so that electric wave reaching areas of both the antennas 2A and 2B are determined as a read region of the wireless tag 10. Moreover, the wireless tag reader 2 collectively reads tag information from the wireless tag 10 attached to each of commodities accommodated in a shopping basket 9 placed in this read region at fixed intervals, and it is one type of wireless tag reading device. It is to be noted that a memory of the wireless tag 10 attached to each commodity previously stores an ID inherent to this tag and a commodity code of a commodity having this wireless tag 10 attached thereto.

The basket sensor 5 detects the shopping basket 9 placed in the read region of the wireless tag reader 2, and is constituted of, e.g., an optical sensor or a weight sensor.

The POS server 6 is provided with a commodity database 6A in which commodity information such as a commodity name, a unit price, a commodity image and others corresponding to commodity code of each commodity is accumulated, and has a function of performing retrieval in the commodity database 6A in response to an inquiry of a commodity code from the POS terminal 1, calling commodity information corresponding to the inquired commodity code and returning the called commodity information to the POS terminal 1.

Figure 3:
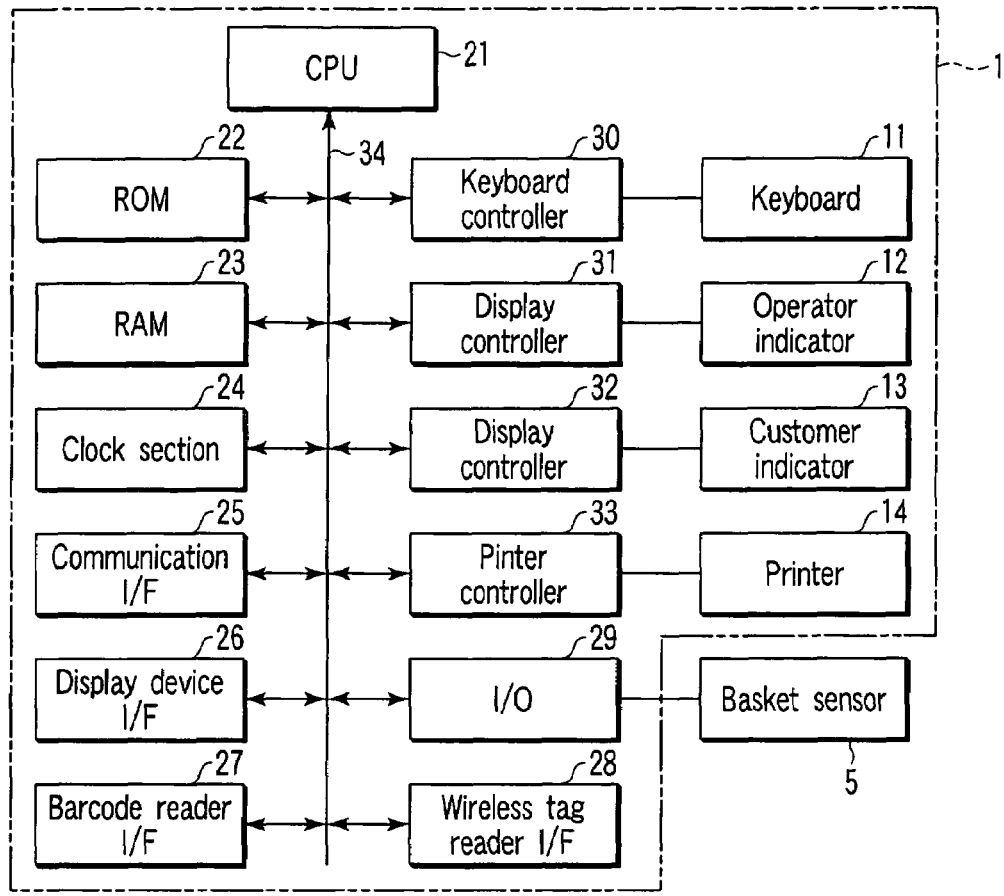
FIG. 3 is a block diagram showing a main structure of a POS terminal in the first embodiment.

FIG. 3 is a block diagram showing a primary structure of the POS terminal 1. The POS terminal 1 is provided with a CPU (Central Processing Unit) 21 constituting a control section main body, an ROM (Read Only Memory) 22 in which program data or the like required for this CPU 21 to control each section is stored, an RAM (Random Access Memory) 23 having various kinds of memory areas used by this CPU 21 when performing calculation, display, printing and input/output processing of data and a memory area or the like in which data is temporarily stored, a clock section 24 which clocks a current date and time, a communication interface 25 which performs data communication with the POS server 6, a display device interface 26 which transmits display data to the display device 4, a barcode reader interface 27 which receives barcode data from the barcode reader 3, a wireless tag reader interface 28 which receives tag information from the wireless tag reader 2, an I/O (Input/Output) port 29 which inputs a detection signal from the basket sensor 5, a keyboard controller 30 which controls key input of the keyboard 11, a display controller 31 which controls screen display of the operator indicator 12, a display controller 32 which controls screen display of the customer indicator 13, a printer controller 33 which controls a printing operation of the printer 14, and others. The CPU 21, the ROM 22, the RAM 23, the clock section 24, the I/O port 29, the respective interfaces 26 to 28 and the respective controllers 30 to 33 are connected with each other through a bus line 34 such as an address bus or a data bus.

Figure 4:
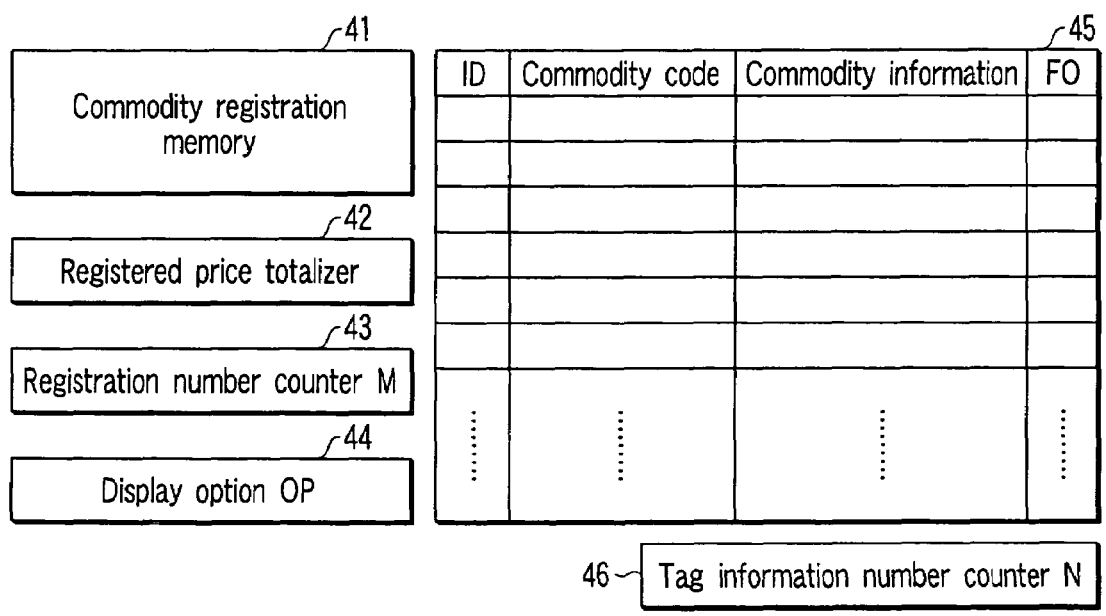
FIG. 4 is a view showing a main memory area formed in an RAM of the POS terminal.

In the POS terminal 1 having such a configuration, as shown in FIG. 4 in particular, in the RAM 23 are formed various kinds of memory areas such as a commodity registration memory 41 in which commodity information of a commodity for sale is registered, a registered price totalizer 42, a registered number counter 43, a display option memory 44, a tag information memory 45, a tag information number counter 46 and others. The registered price totalizer 42 is an area in which prices of registered commodities purchased by one customer are totalized. The registered number counter 43 is an area in which the number M of registered commodities purchased by one customer is counted.

The tag information memory 45 is an area which temporarily stores storage information (an ID and a commodity code) of the wireless tag 10 collectively read by the wireless tag reader 2, commodity information (a commodity name, a unit price, a commodity image and others) corresponding to the commodity code, and a processing finish flag F0 for each tag information. The tag information number counter 46 is an area which counts the number N of sets of unprocessed tag information of tag information stored in the tag information memory 45.

The display option memory 44 is an area which stores option information OP corresponding to a format selected and specified from a plurality of information display formats with respect to the display device 4. The information display format is specified based on option information OP=1 to 3.

Figure 5:
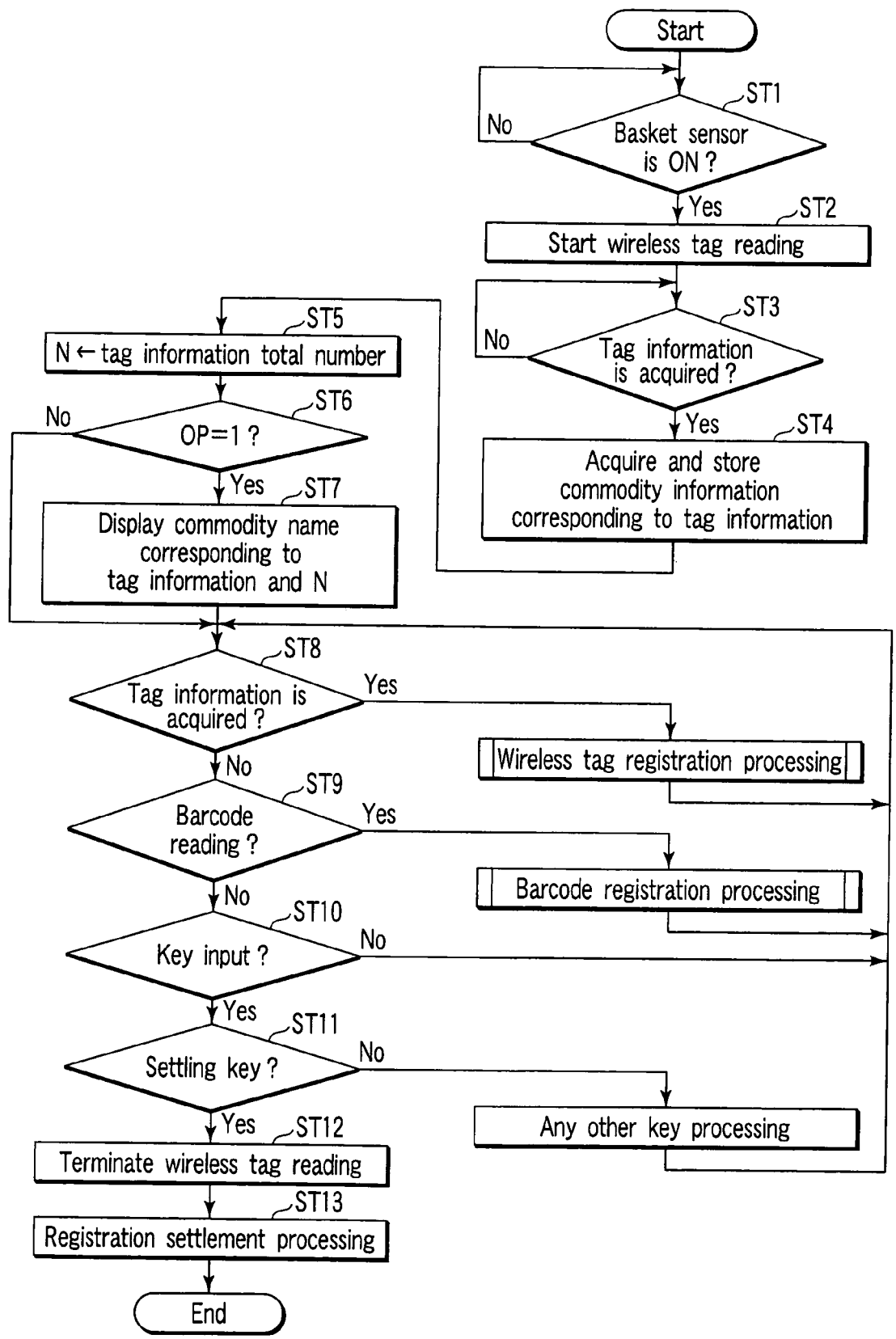
FIG. 5 is a flowchart showing a main control processing procedure executed by a CPU of the POS terminal.

The CPU 21 controls registration of commodities for sale purchased by one customer to settlement of his/her payment in accordance with a procedure shown in a flowchart of FIG. 5. That is, the CPU 21 waits for an on signal from the basket sensor 5 as an initial state after completion of settlement of a previous customer (ST1). Additionally, when the shopping basket 9 is placed in the read region of the wireless tag reader 2 and the on signal is output from the basket sensor 5, the CPU 21 instructs the wireless tag reader 2 to start a read operation (ST2).

As a result, the wireless tag reader 2 starts the read operation to collectively read tag information of the wireless tag 10 attached to each commodity placed in the read region, and transmits the collectively read tag information to the POS terminal 1. The wireless tag reader 2 repeats this read operation at fixed intervals (e.g., one-second intervals), and transmits the collectively read tag information to the POS terminal 1 each time.

After instructing the wireless tag reader 2 to start the read operation, the CPU 21 waits for tag information to be transmitted from the wireless tag reader 2 (ST3). Further, when first tag information collectively read by the wireless tag reader 2 is received, the CPU 21 acquires each commodity code from each tag information, and fetches commodity information (a commodity name, a unit price, a commodity image and others) corresponding to each commodity code from the commodity database 6A of the POS server 6. Furthermore, first all tag information collectively read by the wireless tag reader 2 and commodity information corresponding to each commodity code in the tag information form a pair, the processing finish flag F0 indicative of an unprocessed state "0" is given to this pair, and this pair is stored in the tag information memory 45 (ST4). Moreover, the CPU 21 counts the number N of tag information stored in the tag information memory 45 by using the tag information number counter 46, and stores the counted number (ST5).

Then, the CPU 21 checks option information OP set in the display option memory 44 (ST6). Additionally, when "1" indicative of a first information display format is set as the option information OP, the CPU 21 calls commodity names corresponding to commodity codes in all tag information stored in the tag information memory 45, and displays a list of the called commodity names in the display device 4. Further, a count value N (the tag information number) in the tag information number counter 46 is also displayed as the commodity read number in the display device 4 (ST7). When any other option information OP is set, the CPU 21 does not display any information in the display device 4 at this point in time.

Then, the CPU 21 waits for next tag information collectively read by the wireless tag reader 2 to be transmitted from the wireless tag reader 2 (ST8), or waits for barcode information to be transmitted from the barcode reader 3 (ST9), or waits for key input to the keyboard 11 (ST10).

Figure 6:
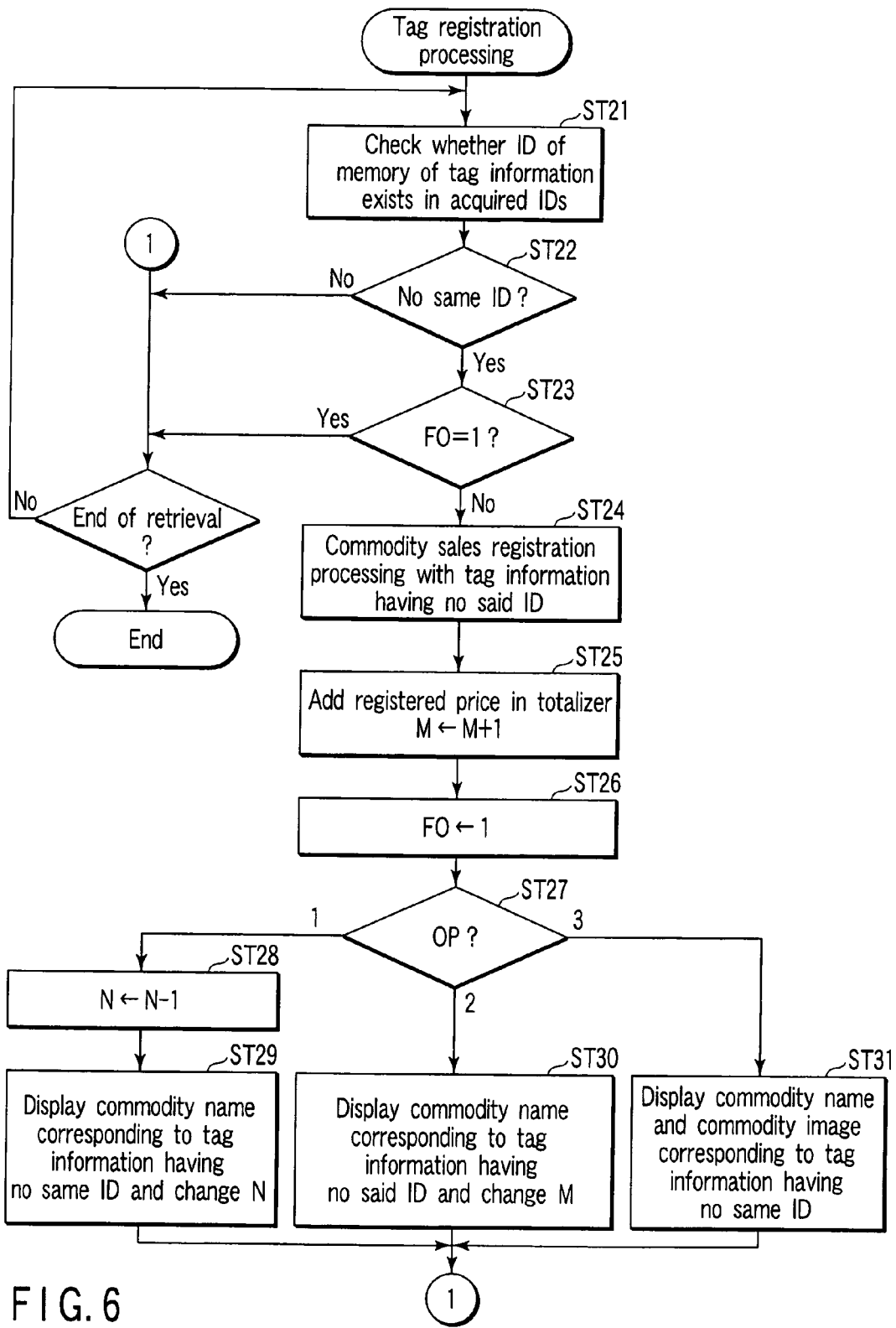
FIG. 6 is a flowchart concretely showing contents of wireless tag registration processing in FIG. 5.

Furthermore, the CPU 21 executes tag registration processing which is concretely shown in a flowchart of FIG. 6 every time tag information transmitted at fixed intervals from the wireless tag reader 2 is input thereto. That is, the CPU 21 checks whether an ID of tag information (the ID, the commodity code) stored in the tag information memory 45 exists in the currently read tag information (ST21: retrieving means). Moreover, when all IDs stored in the tag information memory 45 exist in the currently read tag information (ST22), this tag registration processing is terminated.

On the contrary, when an ID which does not exit in the currently read wireless tag information is detected from IDs in the tag information stored in the tag information memory 45, the CPU 21 executes the following processing with respect to this ID. That is, the CPU 21 performs retrieval in the tag information memory 45, and judges whether the processing finish flag F0 corresponding to this ID is set to "1" (ST23). Additionally, when the processing finish flag F0 is set to "1", the processing corresponding to this ID is terminated.

When the processing finish flag F0 corresponding to this ID is reset to "0", the CPU 21 performs retrieval in the tag information memory 45, and reads a commodity code and commodity information corresponding to this ID. Further, a unit price in the commodity information is determined as a sales price, "1" is determined as the number of sales, and commodity sales information consisting of the commodity code, the sales price and the number of sales is subjected to sales registration processing in the commodity registration memory 41 (ST24: first commodity sales registration processing means). Furthermore, the registered sales price is added in the registered price totalizer 42, and the registered number counter 43 is incremented by "1" (ST25). Moreover, the processing finish flag F0 which is stored to correspond to this ID in the tag information memory 45 is set to "1" (ST26).

Then, the CPU 21 checks the option information OP set in the display option memory 44 (ST27). Here, when "1" is set as the option information OP, the CPU 21 decrements the count value N of the tag information number counter 46 by "1" (ST28), then changes a display mode of a commodity name of the corresponding to this ID displayed in the display device 4 to a special display mode, e.g., a black-and-white reversed display mode, and changes the commodity read number to the count value N in the tag information number counter 46 in order to inform a cashier that sales information of the corresponding commodity has been subjected to registration processing (ST29: informing means).

On the other hand, when "2" indicative of a second information display format is set as the option information OP, the CPU 21 displays a commodity name corresponding to the ID read from the tag information memory 45 and the count value N in the registered number counter 43 in the display device 4 in order to inform the cashier that sales information of the corresponding commodity has been subjected to registration processing (ST30: informing means).

Additionally, when "3" indicative of a third information display format is set as the option information OP, the CPU 21 displays a commodity name and a commodity image corresponding to the ID read from the tag information memory 45 in the display device 4, thereby informing the cashier that sales information of the corresponding commodity has been subjected to registration processing (ST31: informing means).

Then, the CPU 21 terminates the processing with respect to the corresponding ID. Thereafter, every time an ID which does not exist in currently read wireless tag information is detected from IDs stored in the tag information memory 45, the CPU 21 executes each processing at ST22 to ST33 with respect to this ID. Further, when retrieval processing is terminated with respect to the ID stored in the tag information memory 45, this wireless tag registration processing is finished.

Figure 7:
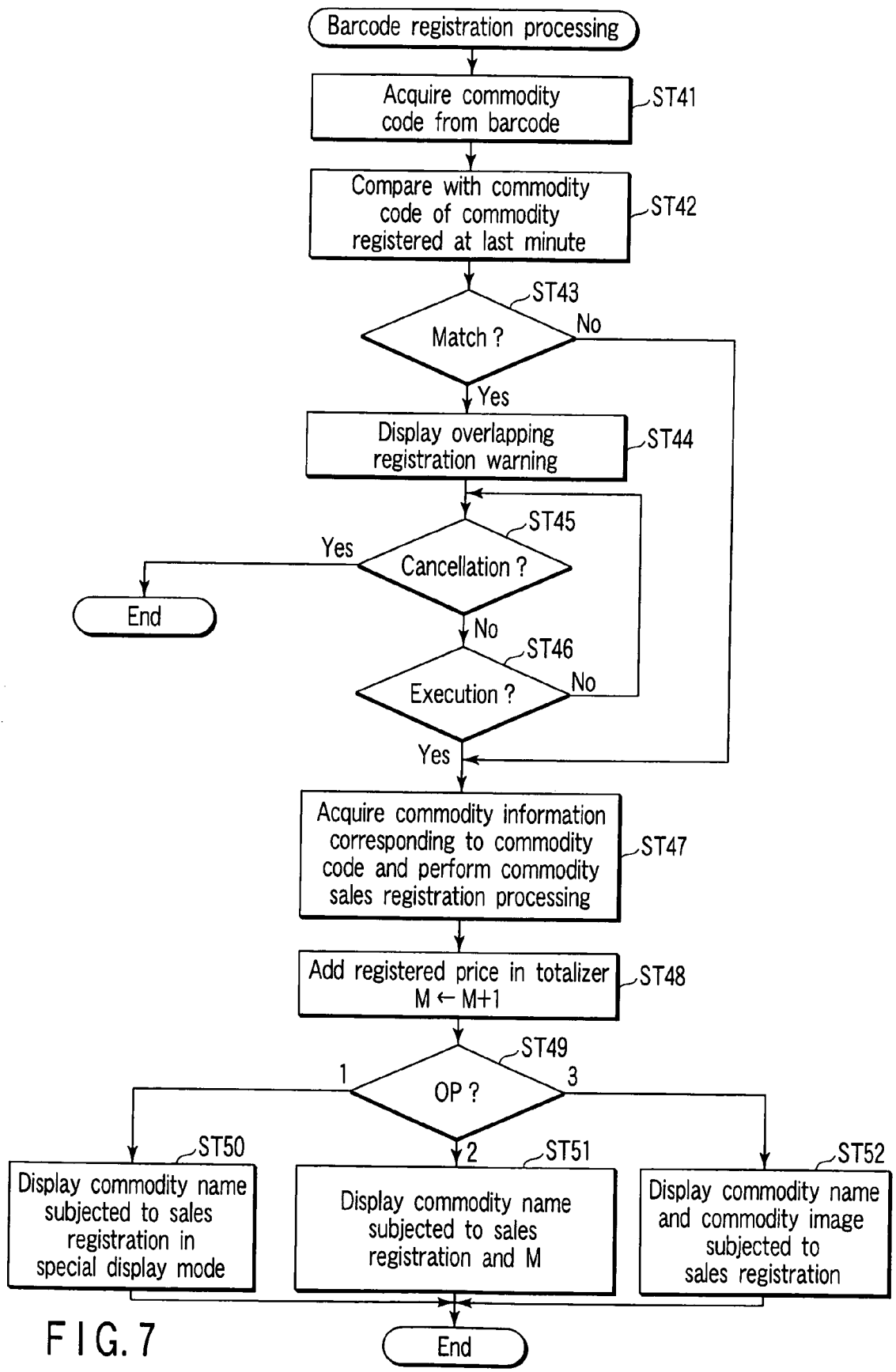
FIG. 7 is a flowchart concretely showing contents of barcode registration processing in FIG. 5.

Furthermore, when barcode information is transmitted from the barcode reader 3, the CPU 21 executes barcode registration processing which is specifically shown in a flowchart of FIG. 7. First, the CPU 21 acquires a commodity code as information concerning a commodity for sale from the input barcode information (ST41). Then, the CPU 21 compares a commodity code of commodity sales information registered at the last minute in the commodity registration memory 41 with the commodity code acquired from the currently input barcode information (ST42). Moreover, when both the commodity codes do not match with each other, the control advances to processing of ST47.

When both the commodity codes match with each other, the CPU 21 displays in the display device 4 a message which warns an operator of overlapping registration (e.g., "a barcode-registered commodity is the same as a commodity registered at the last minute. It is OK?") (ST44). Here, when cancellation is instructed by a key operation to the keyboard 11 (ST45), the CPU 21 eliminates overlapping registration warning display to terminate the current barcode registration processing. On the other hand, when execution is instructed by a key operation to the keyboard 11 (ST46), the CPU 21 eliminates overlapping registration warning display to advance to processing of ST47.

When a commodity code different from that of a commodity registered at the last minute is input through scanning, or when a commodity code matching with that of the commodity registered at the last minute is input through scanning but execution is instructed by a key operation, the CPU 21 fetches from the commodity database 6A of the POS server 6 commodity information (a commodity name, a unit price, a commodity image and others) corresponding to the commodity code acquired from the barcode information. Additionally, a unit price in this commodity information is determined as a sales price and "1" is determined as the sales number, and the commodity sales information including the commodity code, the sales price and the sales number is subjected to sales registration processing in the commodity registration memory 41 (ST47: second commodity sales registration processing means). Further, the sales price subjected to registration processing is added in the registered price totalizer 42, and the registered number counter 43 is incremented by "1" (ST48).

Then, the CPU 21 checks the option information OP set in the display option memory 44 (ST49). Here, when "1" is set as the option information OP, the CPU 21 displays a commodity name in the commodity information acquired from the commodity database 6A in the display device 4 in a special display mode (ST50). When "2" is set as the option information OP, the CPU 21 displays the commodity name in the commodity information and a count value N in the registered number counter 43 in the display device 4 (ST51). When "3" is set as the option information OP, the CPU 21 displays the commodity name and a commodity image in the commodity information in the display device 4 (ST52). Then, the CPU 21 terminates the current barcode registration processing.

Furthermore, upon detecting key input to the keyboard 11, the CPU 21 executes processing corresponding to this key input. Here, when it is detected that the settling key declaring end of registration of commodities for sale purchased by one customer has been input, the CPU 21 instructs the wireless tag reader 2 to terminate a read operation (ST12). Moreover, the CPU 21 executes regular registration settlement processing including settlement processing, a receipt issue processing or the like with respect to a total price stored in the registered price totalizer 42 (ST13). Additionally, the CPU 21 terminates control processing with respect to a current customer.

In a retail store in which the thus configured commodity sales registration processing system according to this embodiment is configured, when a shopper puts desired commodities to be purchased in the shopping basket 9 and comes to the checkout counter 7, a cashier places the shopping basket 9 in the wireless tag read region of the checkout counter 7. Then, the wireless tag reader 2 starts the read operation, whereby storage information of the wireless tag 10 attached to each commodity accommodated in the shopping basket 9 is read all together.

Now, it is assumed that the shopping basket 9 accommodating "OO cookie", "xx pot noodle" and "□□ coffee" each having the wireless tag 10 attached thereto and "ΔΔ juice" having no wireless tag 10 attached thereto is placed in the read region of the wireless tag reader 2, for example.

Figure 8A:
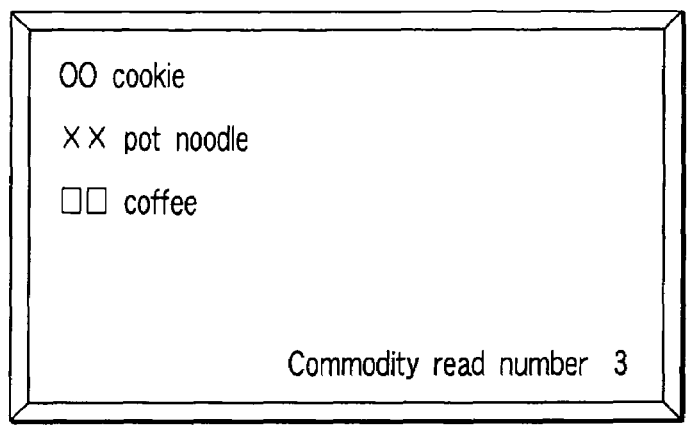
FIG. 8A is a view showing a display example when a first information display format is selected as a display option with respect to a display device in the first embodiment.
Figure 9A:
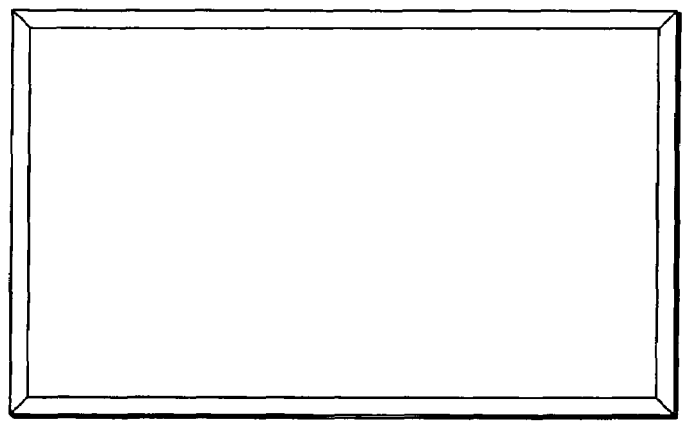
FIG. 9A is a view showing a display example when a second information display format is selected as a display option with respect to the display device.
Figure 10A:
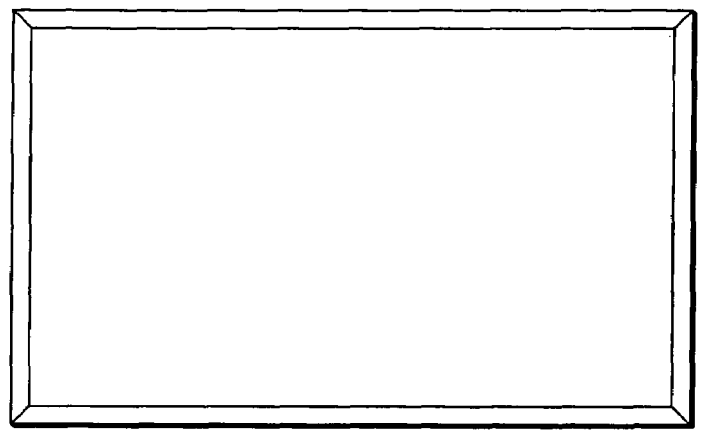
FIG. 10A is a view showing a display example when a third information display format is selected as a display option with respect to the display device.

In this case, assuming that storage information of the wireless tag 10 attached to each of "OO cookie", "xx pot noodle" and "□□ coffee" is normally read by the wireless tag reader 2, when "1" is set as the display option OP, as shown in FIG. 8A, commodity names of the three items whose tag information has been normally read and the commodity read number "3" are displayed in the display device 4. When "2" or "3" is set as the display option OP, as shown in FIG. 9A or 10A, no information is displayed in the display device 4.

Figure 8B:
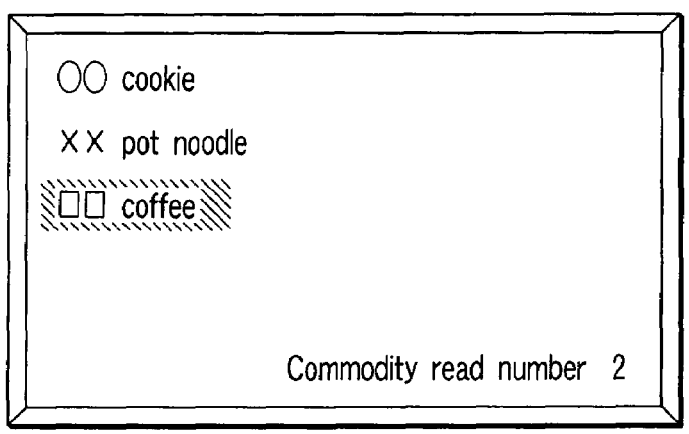
FIG. 8B is a view showing a display example when the first information display format is selected as a display option with respect to the display device in the first embodiment.
Figure 9B:
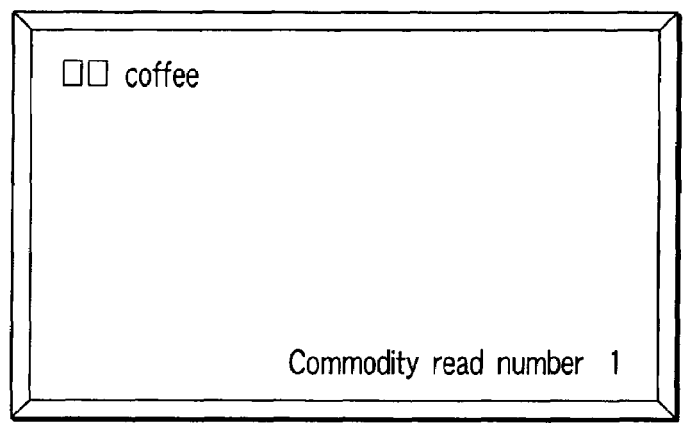
FIG. 9B is a view showing a display example when the second information display format is selected as a display option with respect to the display device.
Figure 10B:
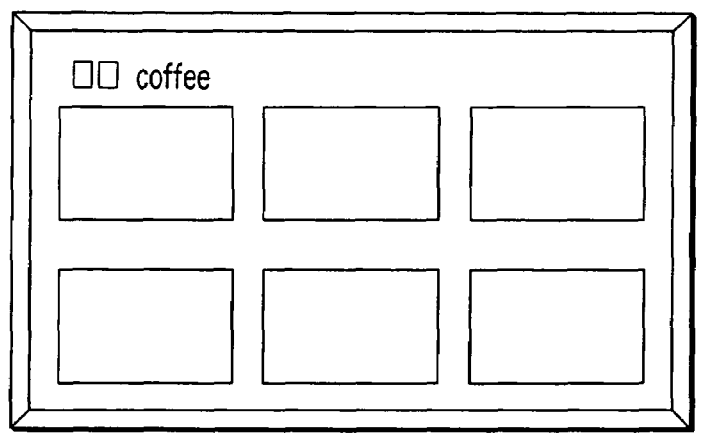
FIG. 10B is a view showing a display example when the third information display format is selected as a display option with respect to the display device.

Next, a cashier prepares an empty shopping basket 9' on the store outer side apart from the barcode reader 3 of the checkout counter 7. Then, he/she takes out the commodities from the shopping basket 9 and moves them into the empty shopping basket 9'. For example, it is assumed that he/she has first moved the commodity which is "□□ coffee". Then, the tag information of the wireless tag 10 attached to this commodity "□□ coffee" cannot be read when the commodity "the □□ coffee" deviates from the read region of the wireless tag reader 2, and hence sales information of the commodity "□□ coffee" is registered in the commodity registration memory 41. Additionally, when "1" is set as the display option OP, as shown in FIG. 8B, the commodity name of the commodity "the □□ coffee" is displayed in a special mode, e.g., a black-and-white reversed display mode, and the commodity read number is decremented to "2". When "2" is set as the display option OP, as shown in FIG. 9B, the commodity name of the commodity "□□ coffee" and the commodity registered number "1" are displayed in the display device 4. When "3" is set as the display option OP, as shown in FIG. 10B, the commodity name and a commodity image of the commodity "□□ coffee" are displayed in the display device 4. Therefore, since display contents in the display device 4 are changed, the cashier can recognize that the commodity "□□ coffee" taken out from the shopping basket 9 is a commodity whose sales information has been registered through the wireless tag reader 2. Then, the cashier puts the commodity "□□ coffee" in the empty basket 9'.

Figure 8C:
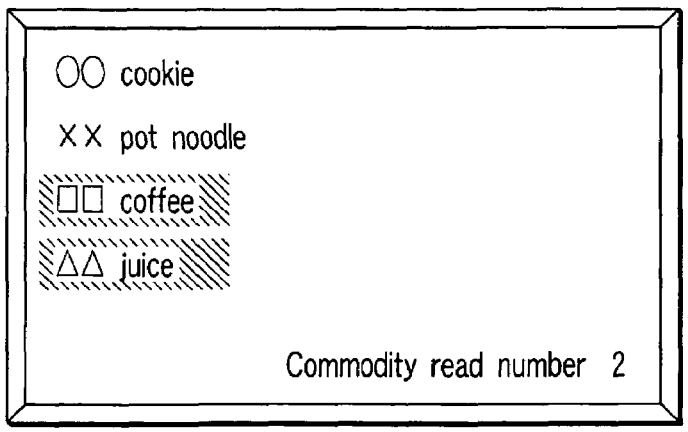
FIG. 8C is a view showing a display example when the first information display format is selected as a display option with respect to the display device in the first embodiment.
Figure 9C:
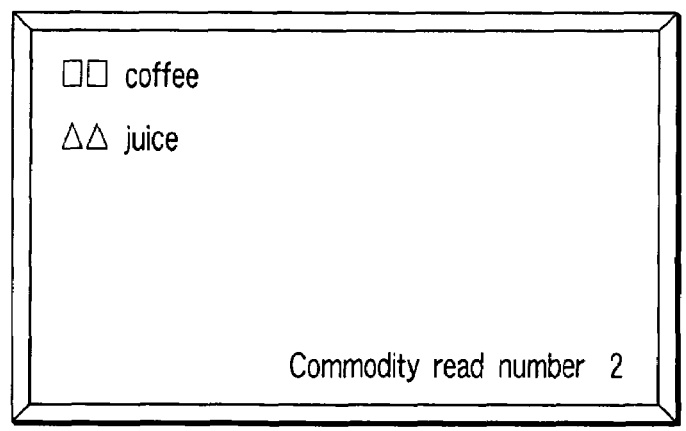
FIG. 9C is a view showing a display example when the second information display format is selected as a display option with respect to the display device.
Figure 10C:
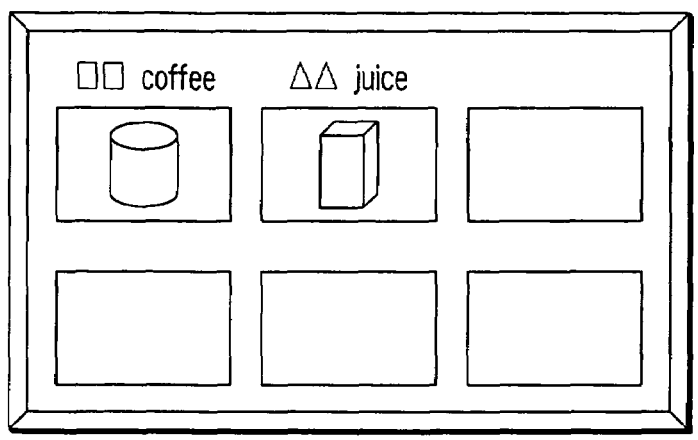
FIG. 10C is a view showing a display example when the third information display format is selected as a display option with respect to the display device.

Next, it is assumed that the cashier has taken out the commodity "ΔΔ juice" from the shopping basket 9 and moved into the empty basket 9'. Then, since this commodity "ΔΔ juice" does not have a wireless tag attached thereto, display contents in the display device 4 are not changed irrespective of the display option OP. Therefore, since the display contents of the display device 4 are not changed, the cashier can recognize that the commodity "ΔΔ juice" taken out from the shopping basket 9 is a commodity whose sales information has not been registered through the wireless tag reader 2. Thus, the cashier uses the barcode reader 3 to read a barcode attached to the commodity "ΔΔ juice" so that its sales information is registered, and then puts this commodity into the shopping basket 9'. At this time, when "1" is set as the display option OP, as shown in FIG. 8C, a commodity name of the commodity "ΔΔ juice" is additionally displayed in the display device 4 in a special display mode, e.g., a black-and-white reversed display mode, but the commodity read number is not changed. When "2" is set as the display option OP, as shown in FIG. 9C, the commodity name of the commodity "ΔΔ juice" is additionally displayed and the commodity registered number is changed to "2". When "3" is set as the display option OP, as shown in FIG. 10C, the commodity name and a commodity image of the commodity "ΔΔ juice" are additionally displayed in the display device 4.

Next, it is assumed that the cashier has taken out the commodity "OO cookie" from the shopping basket 9 and moved into the shopping basket 9'. In this case, like the commodity "□□ coffee", sales information of the commodity "OO cookie" is registered when the commodity "OO cookie" deviates from the read region of the wireless tag reader 2, and display contents in the display device 4 are changed in accordance with the display option OP.

Here, it is assumed that, when the cashier moves the commodity "OO cookie" into the shopping basket 9', a barcode preprinted on the commodity "OO cookie" is moved toward a read surface 3a of the barcode reader 3 and hence the barcode is read by the barcode reader 3. In this case, since the barcode of the commodity registered at the last minute matches with the barcode of the commodity input through scanning, overlapping warning display is effected in the display device 4. Thus, the cashier instructs cancellation by a key operation. As a result, it is possible to prevent the sales information of the commodity "OO cookie" from being redundantly registered by the wireless tag reader 2 and the barcode reader 3.

When all the commodities accommodated in one shopping basket 9 have moved into the other shopping basket 9' in this manner, the cashier operates the settling key on the keyboard 11 to execute registration settlement processing. As a result, the tag read operation of the wireless tag reader 2 is stopped until the shopping basket 9 of a next customer is placed in the read region.

As described above, according to this embodiment, the cashier can easily recognize whether sales information corresponds to a registered commodity or an unregistered commodity by collective reading of the wireless tag 10 by the wireless tag reader 2 when he/she performs a simple operation of just taking out each commodity from the shopping basket 9 placed in the read region of the wireless tag reader 2 and moving it to the outside of the read region. Therefore, even when both a commodity having the wireless tag 10 attached thereto and a commodity having no wireless tag 10 exist, the cashier does not have to confirm whether the wireless tag 10 is attached to each commodity taken out from the shopping basket 9 each time, thereby improving workability. Further, even when tag information cannot be read by the wireless tag reader 2 because the wireless tag 10 has a failure or the wireless tag 10 overlaps the wireless tag 10 attached to another commodity or a metallic commodity in the shopping bag 9, this type of commodity can be readily recognized in this embodiment, and hence an effect of this embodiment is great.

Meanwhile, as a case where tag information cannot be read by the wireless tag reader 2, there can be considered a case where the wireless tag 10 overlaps another wireless tag 10 or a metal as well as a case where the wireless tag 10 has a failure as described above. Furthermore, in such a case, sales information of a corresponding commodity is registered by scanning registration of a barcode in the first embodiment. However, in regard to a commodity whose wireless tag 10 normally functions, it is desirable to register the sales information based on tag information of this wireless tag 10. Moreover, there can be supposed a case where a commodity having no barcode exists in commodities each having the wireless tag 10. Of course, sale information of a commodity having no barcode can be registered by, e.g., inputting a commodity code through keys, but a cashier requires more effort in such a case. Thus, a description will now be given as to a second embodiment in which sale information can be separately registered based on tag information of a wireless tag 10 of a commodity which has not been registered by collective reading using a wireless tag reader 2 even though the normal wireless tag 10 is attached to this commodity with reference to the accompanying drawings.

Second Embodiment

Figure 11:
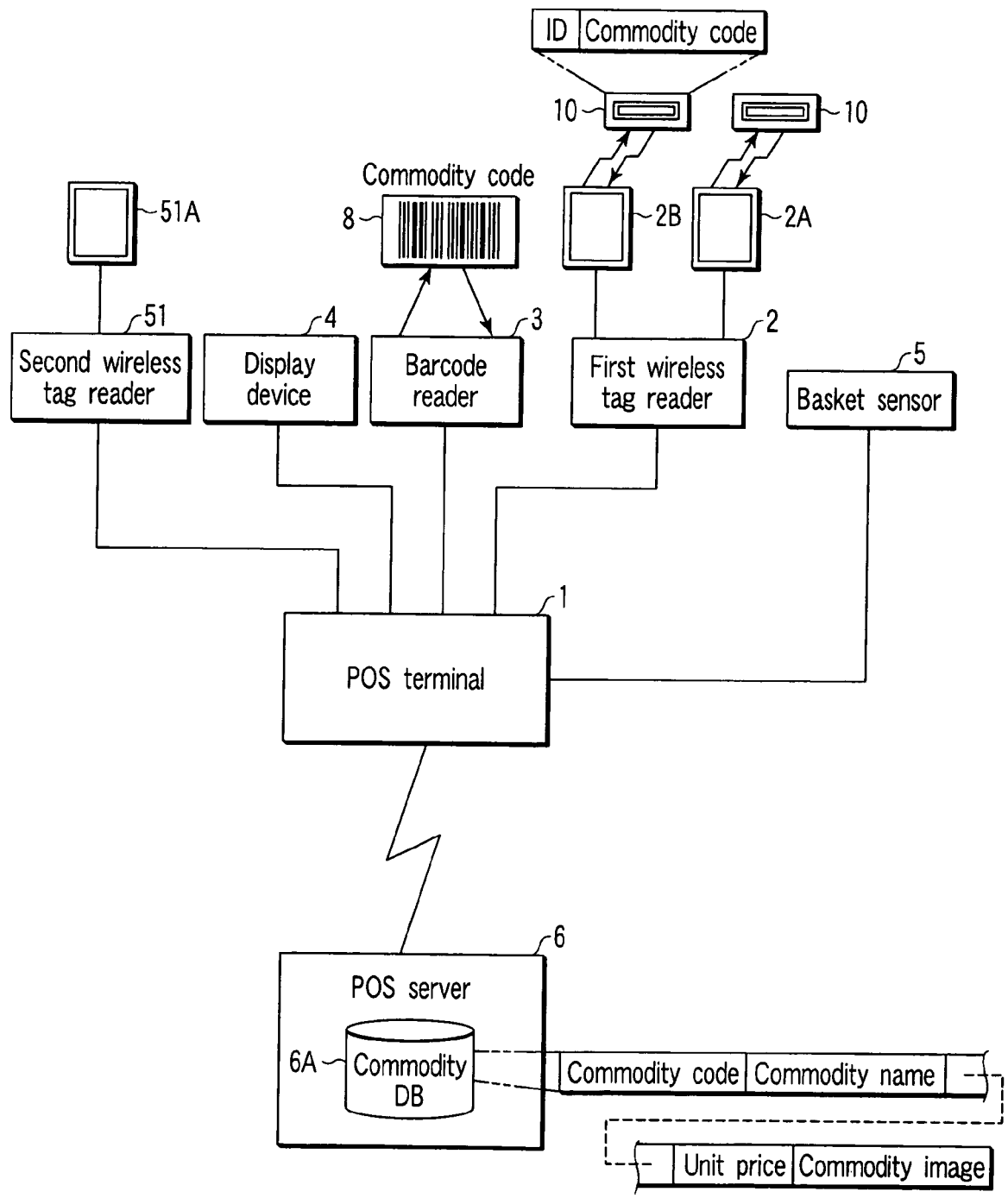
FIG. 11 is a block structural diagram showing a commodity sales registration processing system in a second embodiment.
Figure 12:
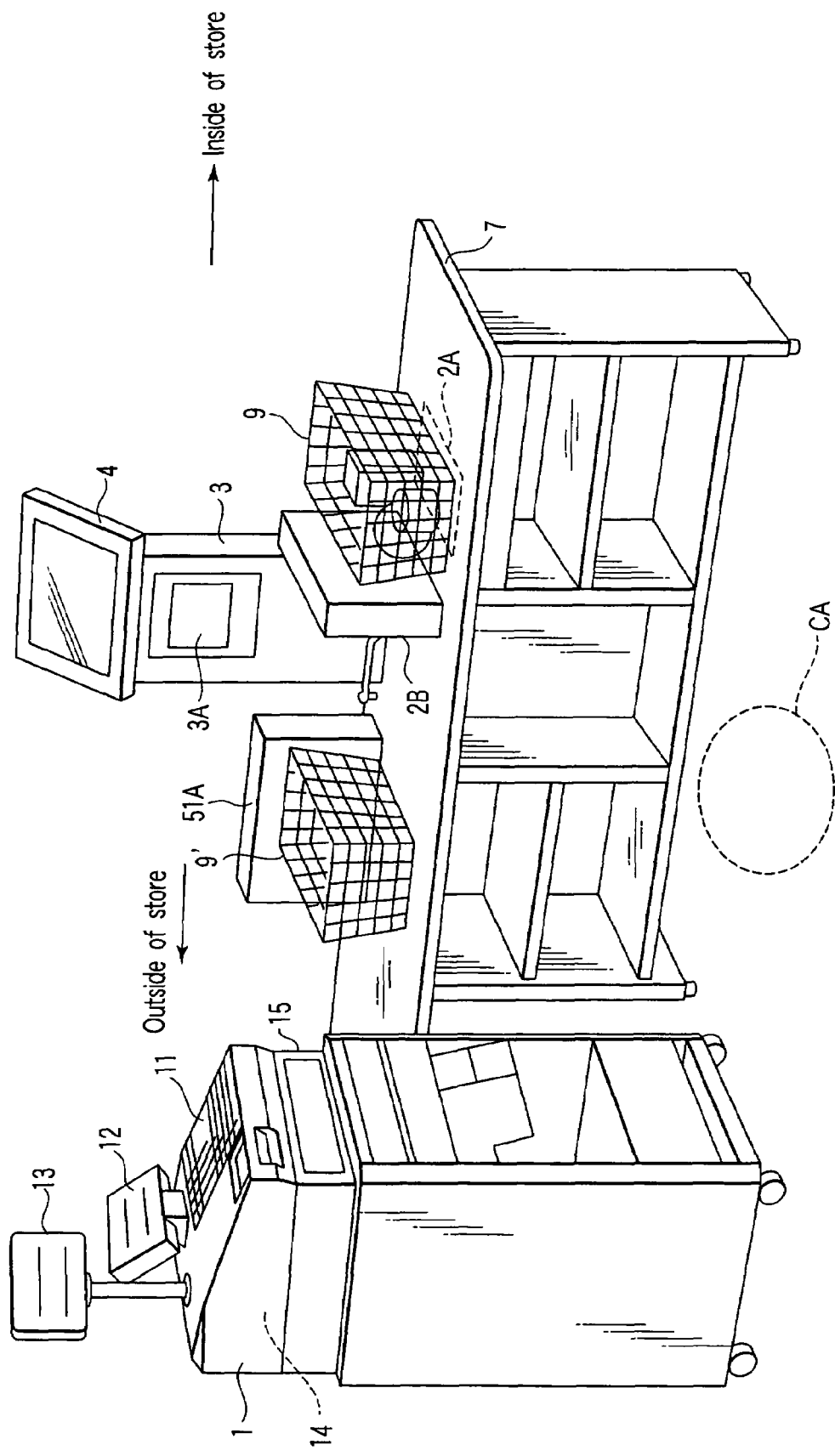
FIG. 12 is a schematic view of a checkout section in the second embodiment.

FIG. 11 is a block structural diagram showing a commodity sales registration processing system in the second embodiment. FIG. 12 is a schematic view of a checkout section in which the commodity sales registration processing system is introduced. This system is different from that in the first embodiment in that a second wireless tag reader 51 having an antenna 51A disposed on a store outer side apart from a barcode reader 3 of a checkout counter 7 is additionally provided besides a first wireless tag reader 2 having antennas 2A and 2B disposed on a store inner side apart from the barcode reader 3 of the checkout counter 7, and that this second wireless tag reader 51 is connected with a wireless tag reader interface 28 of a POS terminal 1 like the first wireless tag reader 2, and any other structures are the same as those in the first embodiment. The antenna 51A is set between the barcode reader 3 and a place where an empty shopping basket 9' is arranged, and a tag read region of the second wireless tag reader 51 is formed in a path along which a commodity taken out from a shopping basket 9 by a cashier CA is moved into the empty shopping basket 9'. Further, the second wireless tag reader 51 receives a read operation start instruction from a CPU 21 to start a read operation when an on signal is output from a basket sensor 5, and it receives a read operation end instruction from the CPU 21 to terminate a read operation when a settling key which declares end of registration of each commodity for sale is input.

Figure 13:
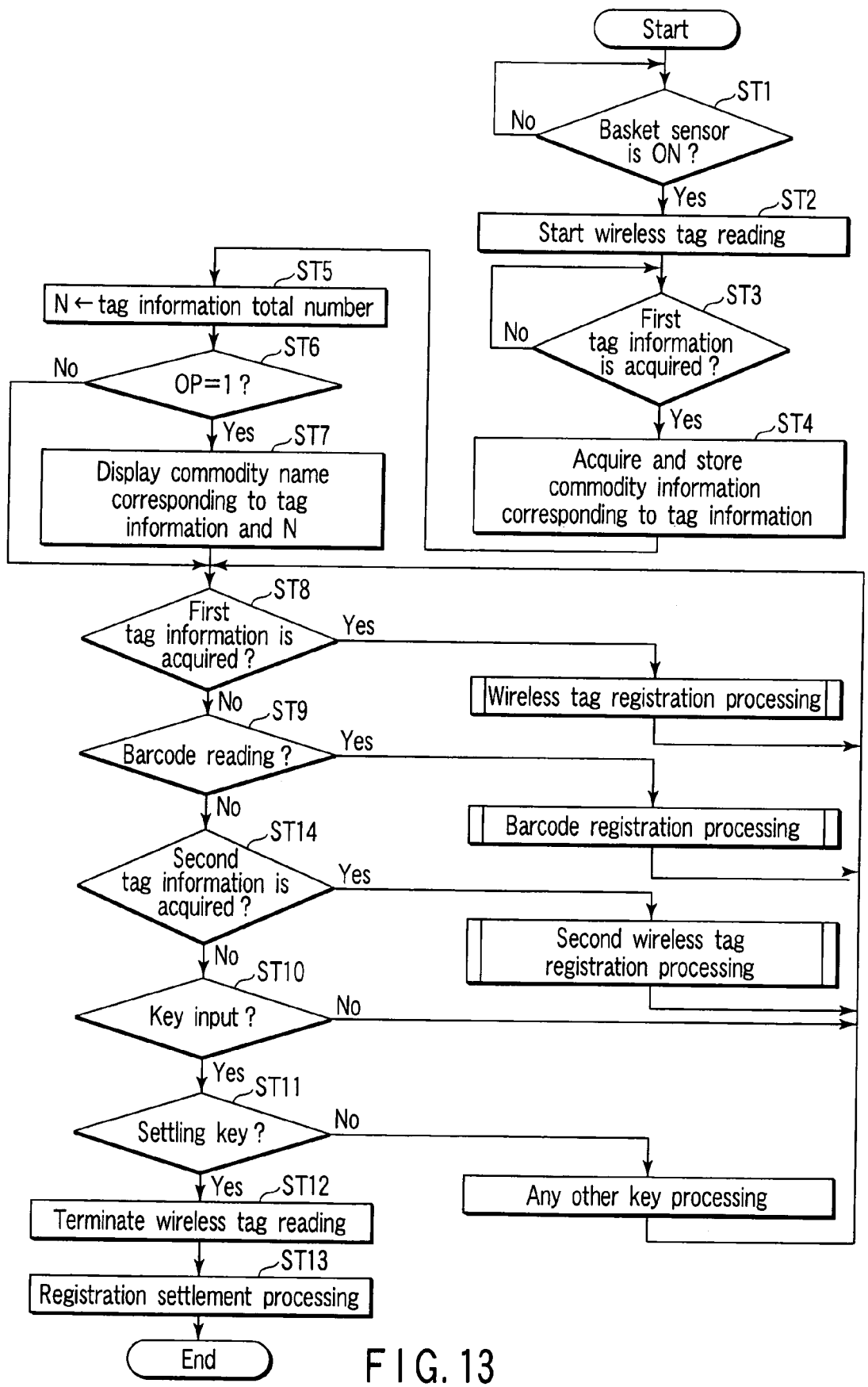
FIG. 13 is a flowchart showing a main control processing procedure executed by a CPU of a POS terminal in the second embodiment.

In such a configuration, the CPU 21 of the POS terminal 1 performs control from registration of commodities for sale purchased by one shopper to settlement for payment in accordance with a procedure shown in a flowchart of FIG. 13. It is to be noted that, in FIG. 13, like reference numerals denote parts which show the same control as that in the first embodiment and are equal to the parts in FIG. 5.

That is, in this control, this embodiment is different from the first embodiment in that, after first tag information collectively read by the first wireless tag reader 2 is acquired, next tag information is transmitted from the first wireless tag reader 2 (ST8), or barcode information is transmitted from the barcode reader 3 (ST9), or tag information is transmitted from the second wireless tag reader 51 (ST14), or key input in a keyboard 11 is waited (ST10). Furthermore, when barcode information is transmitted from the barcode reader 3, and when key input is performed, the same processing as that in the first embodiment is executed. It is to be noted that the second wireless tag reader 51 also starts a read operation in response to an instruction of processing at ST2 and stops the read operation in response to an instruction of processing at ST12 like the first wireless tag reader 2.

Figure 14:
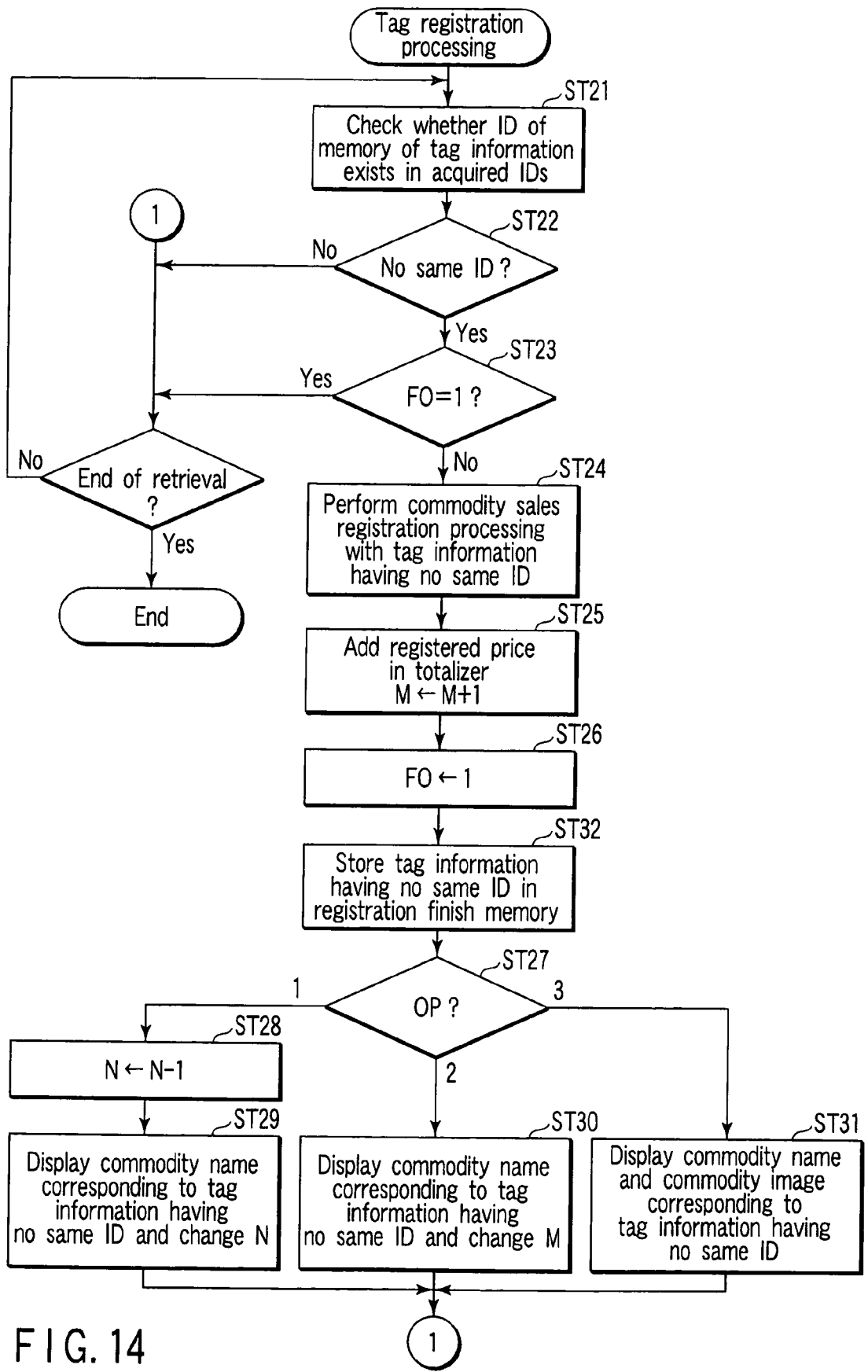
FIG. 14 is a flowchart concretely showing contents of wireless tag registration processing in FIG. 13.

On the other hand, when tag information transmitted from the first wireless tag reader 2 at fixed intervals is received, the CPU 21 executes tag registration processing which is specifically shown in a flowchart of FIG. 14. It is to be noted that, in FIG. 14, like reference numerals denote parts which show the same processing as that in the first embodiment and are equal to the parts in FIG. 6.

That is, in this tag registration processing, this embodiment is different from the first embodiment in that, when an ID which does not exist is detected from the currently read tag information, sales information corresponding to this ID is subjected to sales registration processing in a commodity registration memory 41, and then the tag information of this ID is stored in a registration finish memory formed in an RAM 23 (ST32), and any other structures are the same as those in the first embodiment.

Figure 15:
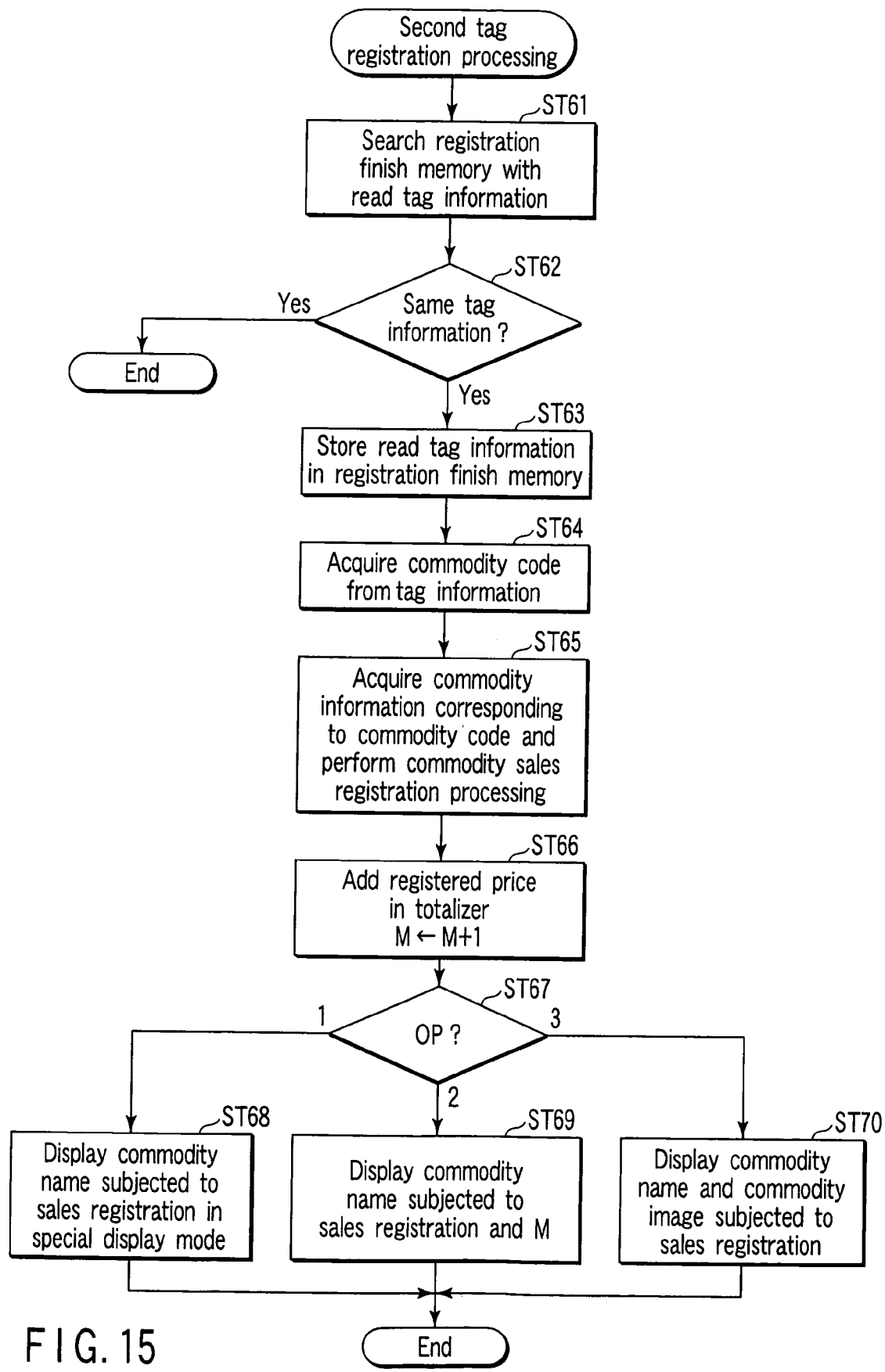
FIG. 15 is a flowchart concretely showing contents of second wireless tag registration processing in FIG. 13.

When a commodity taken out from the shopping basket 9 by the cashier CA is transmitted through the tag read region, the second wireless tag reader 51 reads tag information of a wireless tag attached to the commodity and transmits the read tag information to the POS terminal 1. Upon receiving the tag information transmitted from the second wireless tag reader 51, the CPU 21 executes second tag registration processing which is specifically shown in a flowchart of FIG. 15. First, the CPU 21 checks whether an ID of the currently read tag information exists in IDs of tag information stored in the registration finish memory (ST61). Moreover, when the ID of the currently read tag information exists in the IDs of the tag information stored in the registration finish memory (ST62), the CPU 21 terminates this second tag registration processing.

On the contrary, when the ID of the currently read tag information does not exist in the IDs of the tag information stored in the registration finish memory, the CPU 21 stores the tag information having this ID in the registration finish memory (ST63).

Then, the CPU 21 acquires a commodity code from the tag information having this ID (ST64). Additionally, the CPU 21 fetches commodity information (a commodity name, a unit price, a commodity image and others) corresponding to this commodity code from a commodity database 6A of a POS server 6, and subjects commodity sales information including the commodity code, a sales price and a sales number to sales registration processing in a commodity registration memory 41 with a unit price in this commodity information being determined as the sales price and "1" being determined as the sales number (ST65: second commodity sales registration processing means). Further, the sales price subjected to registration processing is added in a registered price totalizer 42, and increments a registered number counter 43 by "1" (ST66).

Then, the CPU 21 checks option information OP set in a display option memory 44 (ST67). Here, when "1" is set as the option information OP, the CPU 21 displays a commodity name in the commodity information acquired from the commodity database 6A in a display device 4 in a special display mode (ST68). When "2" is set as the option information OP, the CPU 21 displays the commodity name in the commodity information and a count value N of the registered number counter 43 in the display device 4 (ST69). When "3" is set as the option information OP, the CPU 21 displays the commodity name and a commodity image in the commodity information in the display device 4 (ST70). Then, the CPU 21 terminates the current second tag registration processing.

According to the second embodiment having such a configuration, even in case of a commodity which cannot be registered by collective reading by the first wireless tag reader 2 although it has a normal wireless tag 10, sales information of this commodity can be automatically subjected to registration processing when the cashier moves this commodity from one shopping basket 9 to the other shopping basket 9', thereby improving workability.

Further, even if a commodity whose sales information has been registered when its tag information was read by the first wireless tag reader 2 is moved from the shopping basket 9 into the shopping basket 9' so that its tag information is read by the second wireless tag reader 51, since the tag information of this commodity has been stored in the registration finish memory when the sales information of this commodity was registered, there is no possibility that the sales information is redundantly subjected to registration processing.

It is to be noted that the present invention is not restricted to the foregoing embodiment.

For example, although the antenna 51A is set between the barcode reader 3 and a position where the empty shopping basket 9' is arranged in the foregoing embodiment, sales information of a commodity which has not been registered by collective reading by the first wireless tag reader 2 can be automatically subjected to registration processing by moving this commodity into the shopping basket 9' even when the antenna 51 is embedded in the checkout counter 7 and the empty basket 9' is placed above the embedded antenna.

Furthermore, although the cashier takes out commodities one by one from the shopping basket 9 in the foregoing embodiment, it is possible to readily recognize whether sales information of an each taken-out commodity has been subjected to registration processing through the wireless tag reader 2 based on presence/absence of a change in display contents in the display device 4 even if a plurality of, e.g., two commodities are simultaneously taken out to be moved into the other shopping basket 9'.

For example, in a case where storage information in wireless tags 10 of two commodities was read by the wireless tag reader 2 when both these commodities were simultaneously taken out from the shopping basket 9, since a display mode of respective commodity names of the two commodities is changed to a special display mode, or commodity names or commodity images of these commodities are additionally displayed, and hence the cashier can recognize that both these commodities were subjected to registration processing. Moreover, when the wireless tag reader 10 is not attached to one commodity, a display mode of a commodity name of the other commodity is changed to a special display mode, a commodity name or a commodity image is additionally displayed, and hence the cashier can recognize that one commodity whose commodity name was displayed in a special display mode or whose commodity name or commodity image was additionally display was subjected to registration processing but the other commodity was not subjected to registration processing. Additionally, when the wireless tags 10 are not attached to both these commodities, since display contents of the display device are not changed, and hence it is possible to recognize that both these commodities were not subjected to registration processing.

Therefore, an effect of greatly reducing an operation time of a registration work can be demonstrated as compared with a conventional commodity sales registration processing system having a barcode specification alone with which commodities must be taken out one by one from the shopping basket 9. Further, the shopping basket 9 does not have to be necessarily placed on the checkout counter 7 in a state where each commodity is accommodated in the shopping basket 9, the functions and effects of the present invention can be demonstrated even when a commodity is directly placed in the read region of the wireless tag reader 2.

Furthermore, although the display option memory 44 is provided and one of the first to third information display formats is selectively set in the foregoing embodiment, any one format may be fixed to eliminate the display option memory 44. Moreover, in the above-described embodiment, as the first information display format, commodity names of commodities having the wireless tags collectively read by the wireless tag reader 2 are concurrently displayed, a collectively read tag information number is displayed, a display mode of a commodity name of a commodity whose commodity information has been subjected to registration processing is changed to a special display mode, e.g., a black-and-white reversed display mode, and the tag information number is subtracted. However, only special display modes such as a black-and-white reversed display mode, a change in a character style, a strike-through display mode or the like may be used to eliminate the tag information number counter 46. Additionally, on the contrary, when the tag information number only is displayed, the tag information number is changed every time commodity information is subjected to registration processing through the wireless tag reader 2, thereby informing the cashier of this change. In this case, it is possible to adopt as the display device 4 a small indicator capable of displaying the tag information number alone.

Further, in the foregoing embodiment, every time tag information which has been previously read but is not currently read by the wireless tag reader 2 is detected, a commodity name or a commodity image corresponding to a commodity code included in this tag information is displayed in the display device 4, or display contents of the display device 4 are changed, thereby informing the cashier. However, the informing means is not restricted to display, and the cashier may be informed by allowing phonation of a corresponding commodity name, for example.

Furthermore, sales information of a commodity having a set commodity code included in tag information which has been previously read but is not currently read by the wireless tag reader 2 is not subjected to registration processing until this tag information is detected in the foregoing embodiment, but the sales information of this commodity may be subjected to registration processing when the tag information is first read by the wireless tag reader 2.

Third Embodiment

Figure 16:
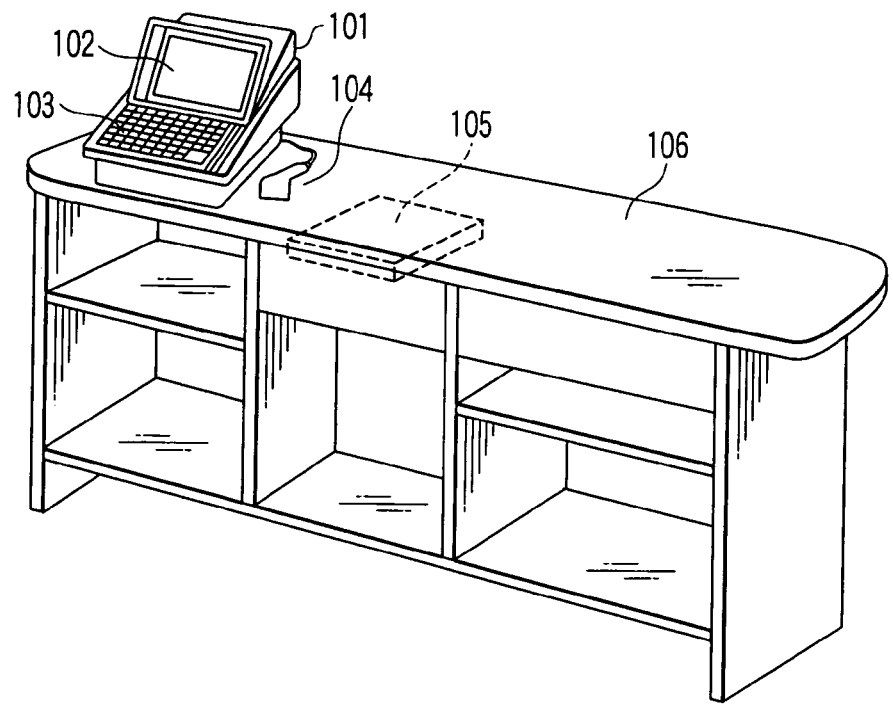
FIG. 16 is an appearance view of a commodity information registering apparatus according to a third embodiment of the present invention.

FIG. 16 is an appearance view of a commodity information registering apparatus. In the drawing, reference numeral 101 denotes a register. This register 101 has an image display section 102 provided with functioning means for displaying an image, and a keyboard 103 serving as inputting means which can be operated by a shop clerk to perform input. To the register 101 is connected a handheld barcode reading section 104 provided with functioning means for reading a barcode attached to a commodity.

Reference numeral 105 designates a wireless tag reading section provided with a communication functioning means for performing communication with a wireless tag. This wireless tag reading section 105 is connected with the register 101, and placed in a register counter 106.

A block diagram of this commodity information registering apparatus will now be described with reference to FIG. 17. In the drawing, reference numeral 115 denotes a control section. This control section 115 controls this commodity information registering apparatus in accordance with a set program.

To the control section 115 are connected an image display section 111, an input section 112, a wireless tag reading section 113, a barcode reading section 114.

The image display section 111 can display a commodity image and also display a commodity name, a price or the like.

The input section 112 is an input device such as a keyboard or a mouse operated by a shop clerk. For example, the input section 112 is provided with a numeric keypad, a confirmation key, a registration canceling key, a scanner switching key and others.

The wireless tag reading section 113 performs wireless communication with a wireless tag attached to a commodity to read information stored in the wireless tag.

The barcode reading section 114 reads a barcode attached to a commodity.

A registering section 116 registers commodity identifying information or a price corresponding to information read by the wireless tag reading section 113 or barcode information read by the barcode reading section 14.

Upon inputting information read by the wireless tag reading section 113 or barcode information read by the barcode reading section 114, a database section 117 outputs image information or a price corresponding to the input information.

Figure 18A:
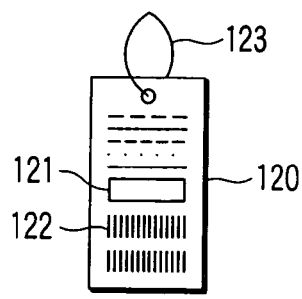
FIG. 18A is an appearance view showing a wireless tag and a barcode attached to a commodity according to the third embodiment.
Figure 18B:
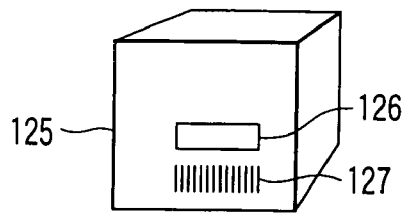
FIG. 18B is an appearance view showing a wireless tag and a barcode attached to a commodity according to the third embodiment.

Examples of a wireless tag and a barcode attached to a commodity will now be described with reference to FIGS. 18A and 18B. FIG. 18A shows a tag 120 attached to clothes, shoes or the like. A wireless tag 121 is attached to the tag 120, and a barcode 122 is printed. Here, information stored in the wireless tag 121 is the same data as the barcode 122. However, when information stored in the wireless tag 121 consists of a serial number only, it is good enough to form a database in the database section 117 in such a manner that the serial number stored in the wireless tag 121 corresponds to the barcode 122.

A hole is formed in the tag 120. A string 123 is inserted into this hole, and the tag is attached to a cloth, a pair of shoes or the like. FIG. 18B is a view showing that a wireless tag 126 and a barcode 127 are attached to a box 125 as an example in which a wireless tag and a barcode are attached to a commodity. In this manner, commodity identifying information which can specify a commodity from stored information is stored in the wireless tag, and commodity identifying information is printed on the barcode.

Figure 19:
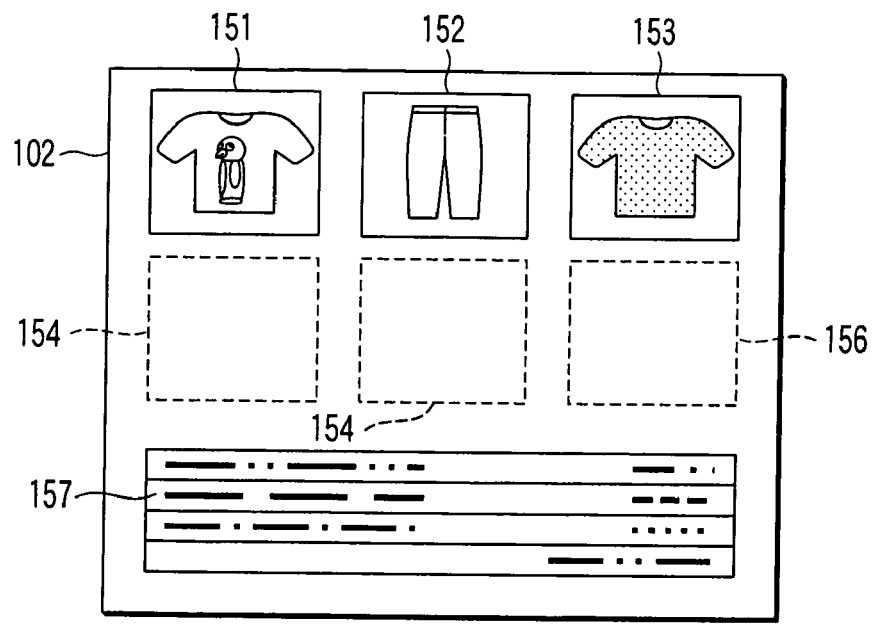
FIG. 19 is a view illustrating screen display according to the third embodiment.

A display screen of the image display section 102 will now be described with reference to FIG. 19. Commodity images corresponding to commodity identifying information read by the wireless tag reading section 105 are displayed in image display frames 151 to 156. The commodity images are displayed in the reading order of the commodity identifying information so that a shop clerk who performs reading can immediately grasp a numerical quantity of commodities and the commodities whose information has been read. Image display frames may be displayed in image display frames 154 to 156 in which no commodity image is displayed, or these image display frames may have the same background color as the screen. A display frame 157 is a portion which displays a character string, and can display a commodity name or a price of a registered commodity, a settled price and others.

Figure 20:
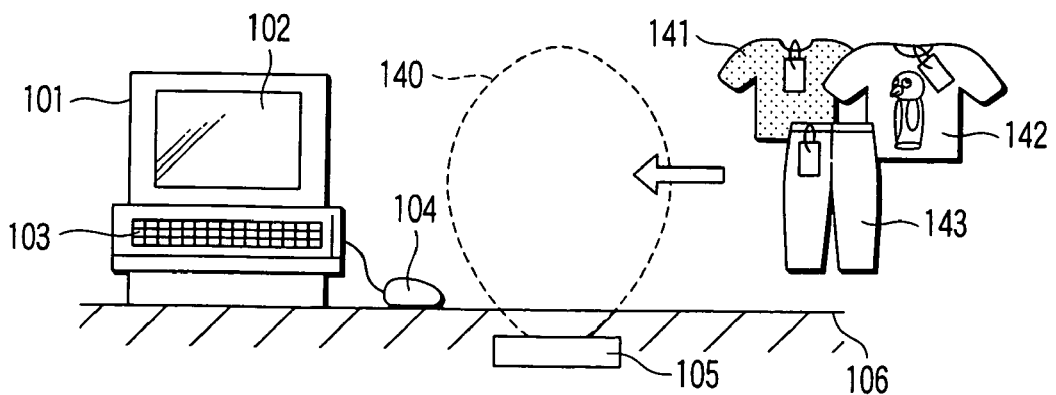
FIG. 20 is a view illustrating a commodity information registering operation according to the third embodiment.
Figure 21:
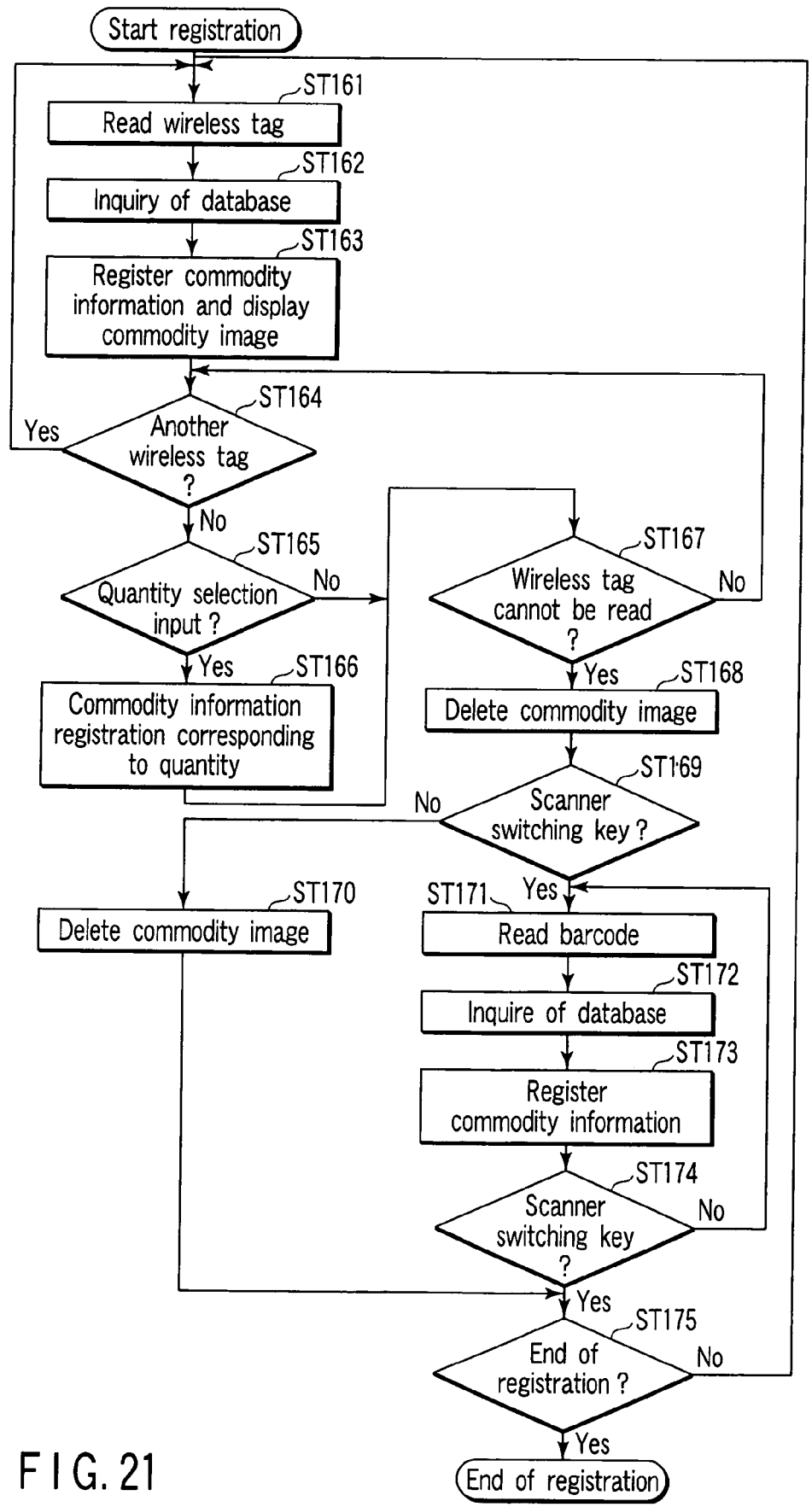
FIG. 21 is a flowchart illustrating the commodity information registering operation according to the third embodiment.

An operation of the third embodiment according to the present invention will now be described with reference to a flowchart of FIG. 21. FIG. 20 is a view illustrating a commodity information registering operation, and FIG. 21 is a flowchart of commodity information registration processing.

Registration of commodity information is started by an operation of the keyboard 103. Then, an electromagnetic wave is output from the wireless tag reading section 105. Further, when the wireless tag enters a read range 140, the wireless tag can be read. The tag shown in FIG. 18A is attached to each of commodities 141 to 143.

When a shop clerk moves the commodities 141 to 143 into the read range 140, the wireless tags are read.

First, at ST161, commodity identifying information of the wireless tag attached to the commodity 142 is read. At ST162, the read commodity identifying information is transmitted to the database section 117, and a commodity name, a price or a commodity image corresponding to the commodity identifying information is transmitted to the control section 115 from the database section 117. At ST163, the control section 115 registers the commodity name or the price in the registering section 116, and displays the commodity image in the image display frame 151 of the image display section 102.

At ST164, whether another wireless tag exists is judged, and the control returns to the processing of ST161 when there is another wireless tag. The wireless tag of the commodity 143 is read at ST161, an inquiry is made to the database at ST162, and a commodity image in commodity information is displayed in the image display frame 152 at ST163. Further, presence/absence of another wireless tag is again judged at ST164.

Since the wireless tag of the commodity 141 is read as another wireless tag, the processing of ST161 to ST163 is executed, and an image of the commodity 141 is displayed in the image display frame 153.

When it is determined that another wireless tag does not exist at ST164, a quantity selection input judgment at ST165 is made. At this time, a shop clerk operates the keyboard 103 to select commodity images for quantity input so that quantities of the selected commodities can be input. When the quantity selection input is performed, commodity information corresponding to the selected commodities and quantities is registered in the registering section 116 at ST166, and the control advances to processing of ST167. When there is no quantity selection input at ST165, the control likewise proceeds to the processing of ST167.

Further, whether the wireless tags can be read is judged at ST167. Since the wireless tags can be read at ST167 when the commodities are placed in the read range 140, the control returns to the processing of ST164. When the commodities 141 to 143 are taken out of the read range 140, the wireless tags cannot be read, it is determined that reading is impossible, and the images of the commodities whose wireless tags cannot be read are deleted from the image display section 2 at ST168. The shop clerk does not have to perform scanner switching as long as all the commodities to be registered can be registered, and hence he/she does not perform scanner switching at ST169 but deletes all of the commodity images which are still displayed in the image display section 102 at ST170, and the control advances to processing of ST175.

Meanwhile, when a commodity does not have a wireless tag or a wireless tag is broken, the wireless tag cannot be read. In such a case, since a commodity image is not displayed in the image displays section 102 even if the commodity is placed in the read range of the wireless tag, the shop clerk can be aware that registration is impossible. At this time, the shop clerk presses a scanner switching key in the keyboard 3 to perform scanner switching at ST169. In scanner switching at ST169, transmission of an electromagnetic wave from the wireless tag reading section 105 is stopped and the barcode reading section 104 is operated.

At ST171, the shop clerk operates the barcode reading section 104 to read a barcode attached to a commodity.

An inquiry is made at the database section 117 about the read barcode at ST172, and a commodity name or a price corresponding to the read barcode is registered in the registering section 116 at ST173. At this time, sound may be produced or registration information may be displayed in the screen frame 157 to let the shop clerk know that barcode has been read. Scanner switching is judged at ST174. When there are more commodities whose barcodes are to be read, the control returns to the processing of ST 171 without switching a scanner. When there is no commodity whose barcode is to be read, the shop clerk presses the scanner switching key in the keyboard 103 to switch the scanner. In scanner switching at ST174, an operation of the barcode reading section 104 is stopped, and an electromagnetic wave is output from the wireless tag reading section 105. Whether registration is to be terminated is judged at ST175. When there are more commodities to be registered, the control returns to the processing of ST161. Termination of this registration is judged by an operation of a settling key of a POS. When all commodities have been registered, registration is terminated.

Figure 22:
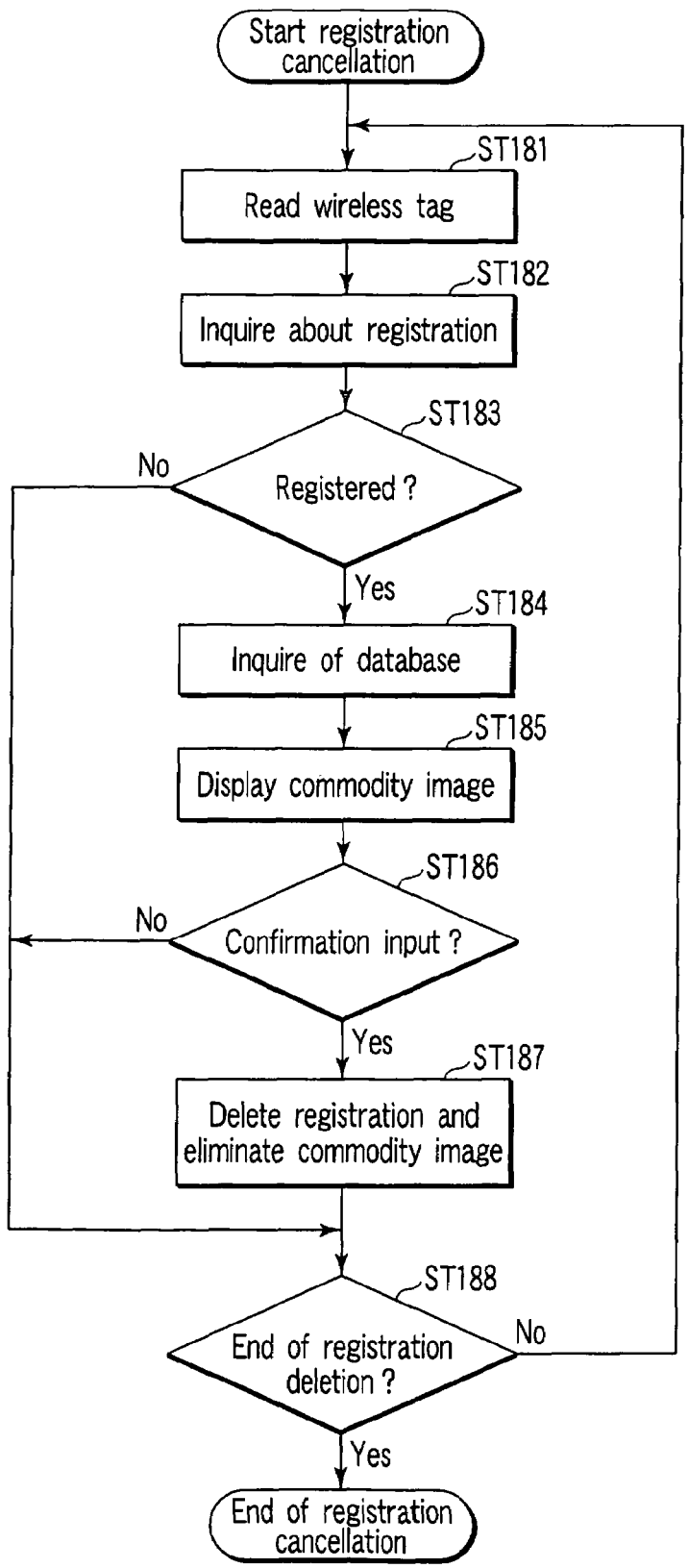
FIG. 22 is a flowchart illustrating commodity information registration cancellation processing according to the third embodiment.

Processing of canceling registration of commodity information registered in the registering section 116 will now be described with reference to a flowchart of FIG. 22. Registration canceling processing is started by operating a registration canceling key in the input section 112. Then, an electromagnetic wave is output from the wireless tag reading section 105, and the read range 140 for the wireless tag is formed. When a shop clerk places a commodity which is a target of registration cancellation in the read range, the wireless tag attached to the commodity is read at ST181 so that commodity identifying information in the wireless tag is read.

When the read commodity identifying information is not registered in the registering section 116 at ST182, the control advances to processing of ST188 where cancellation of registration is not performed. Whether the same information as the read commodity identifying information is registered in the registering section 116 is confirmed at ST182. When there is the same commodity identifying information at ST183, the control advances to processing of ST184. At ST184, the commodity identifying information read at ST182 is transmitted to the database section 117, and the database section 117 transmits commodity image information to the control section 115. At ST185, the commodity image information transmitted to the control section 115 is displayed in the image display frame 151 of the image display section 102. A message urging the shop clerk to input a registration cancellation confirming key is displayed in the image display section 102 at ST186. When registration is not canceled, the control advances to processing at ST188, and registration is not canceled. When key input for registration cancellation is performed at ST186, commodity registering information is deleted from the registering section 116 and an image displayed in the image display frame 151 is eliminated at ST187. Whether registration cancellation is terminated is judged at ST188, the control returns to ST181 if there is another commodity which is a target of registration cancellation, and registration cancellation is terminated when there is no commodity which is a target of registration cancellation.

Registration information can be displayed in the screen display frame 157, and it is used as information for, e.g., a calculation of a total price to be settled or a receipt to be issued by operating the keyboard 103.

A shop clerk sets the number of commodities to be registered at one time to a numerical quantity which can be visually confirmed, and moves each commodity into the wireless tag read range. As an appropriate number of commodities which are moved into the read range at one time, a numerical FIG. 3 to 5 is appropriate although it depends on a size of each commodity. Since the numerical quantity which can be visually recognized by a human in a moment is approximately 7, the number of images which can be displayed in the screen may be set to 7.

According to this configuration, when registering commodity information of commodities each having a wireless tag, a shop clerk can collectively register the plurality of commodities and can be quickly aware of commodities which cannot be registered for some reason. Further, commodity information of commodities which cannot be registered can be registered by reading their barcodes. Therefore, a registration time of commodity registration can be reduced.

Furthermore, when a plurality of equal commodities exist, it is good enough to read information of one commodity alone and then input the quantity of the commodities, thereby reducing the registration time.

Moreover, since a wireless tag attached to a commodity can be utilized when canceling information subjected to commodity registration, a shop clerk does not have to find a position of a barcode and can read the wireless tag of the commodity which is a target of registration cancellation. Therefore, registration cancellation of the registered commodity can be rapidly carried out.

Fourth Embodiment

A fourth embodiment according to the present invention will now be described with reference to FIGS. 23 to 25. In the third embodiment, the description has been given on the conformation in which the handheld barcode reader as the barcode reading section is used and the image display section is different from the input section. In the fourth embodiment, a description will be given as to a conformation in which a barcode reading section is an installed barcode reader and an image display section and an input section are integrally formed.

Figure 23:
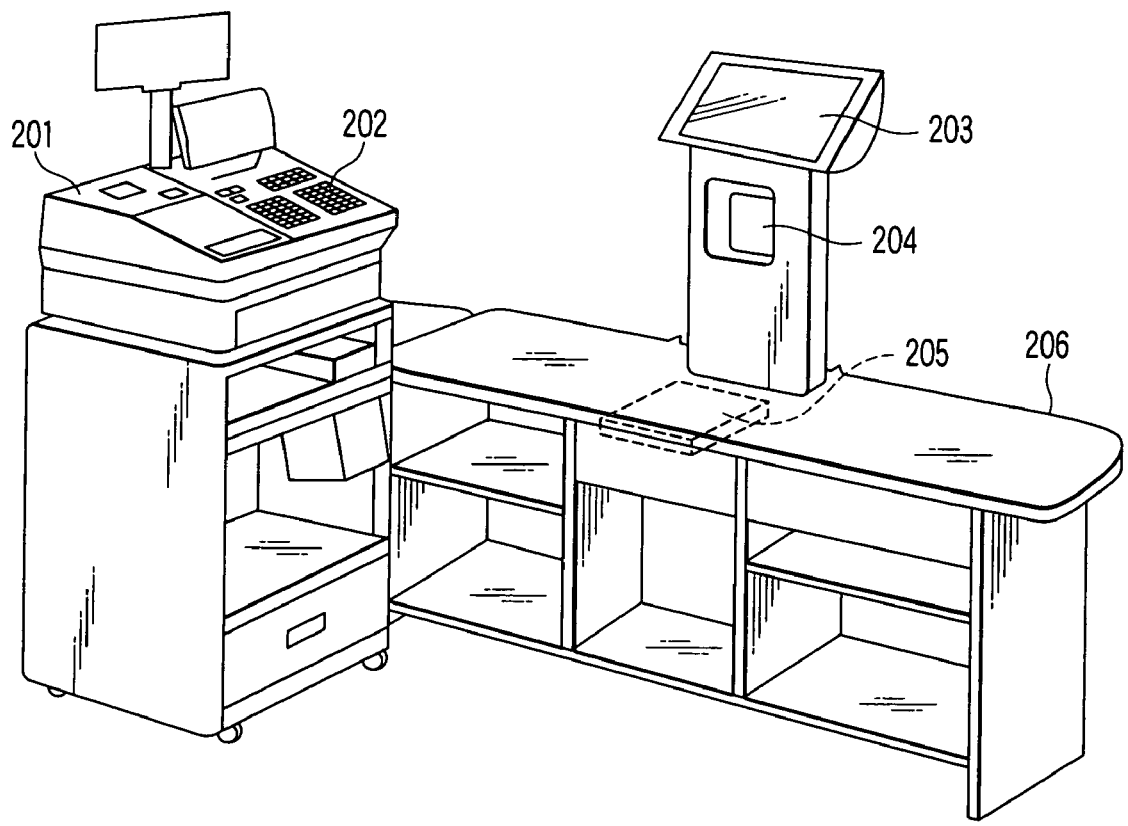
FIG. 23 is an appearance view of a commodity information registering apparatus according to a fourth embodiment.

FIG. 23 is an appearance view of a commodity information registering apparatus according to the fourth embodiment. In the drawing, reference numeral 201 denotes a register. This register 201 is provided with a keyboard 202. A sacker counter 206 on which a shopping basket or the like is placed is arranged beside the register 201, and a barcode reading section 204 and a touch panel 203 are set on this sacker counter 206. A shop clerk which registers commodity information stands in front of the sacker counter 206 to face the touch panel 203, or stands in front of the register 201 to operate the touch panel or the register.

Further, a wireless tag reading section 205 is set in the sacker counter between the touch panel 203 and a shop clerk who operates this touch panel 203. A read range of this wireless tag reading section 205 is formed on the sacker counter 206.

Figure 17:
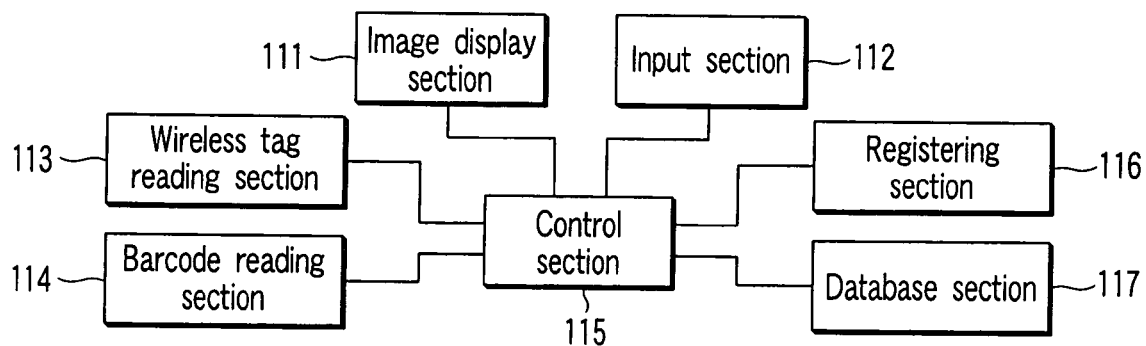
FIG. 17 is a block diagram showing the commodity information registering apparatus according to the 31st embodiment.

The block diagram of the commodity information registering apparatus according to this fourth embodiment is different from the block diagram of FIG. 17 in that the touch panel 203 functions as both an image display section 111 and an input section 112, but any other structures are the same as those in the block diagram of FIG. 17, thereby giving a description by utilizing FIG. 17.

Figure 24:
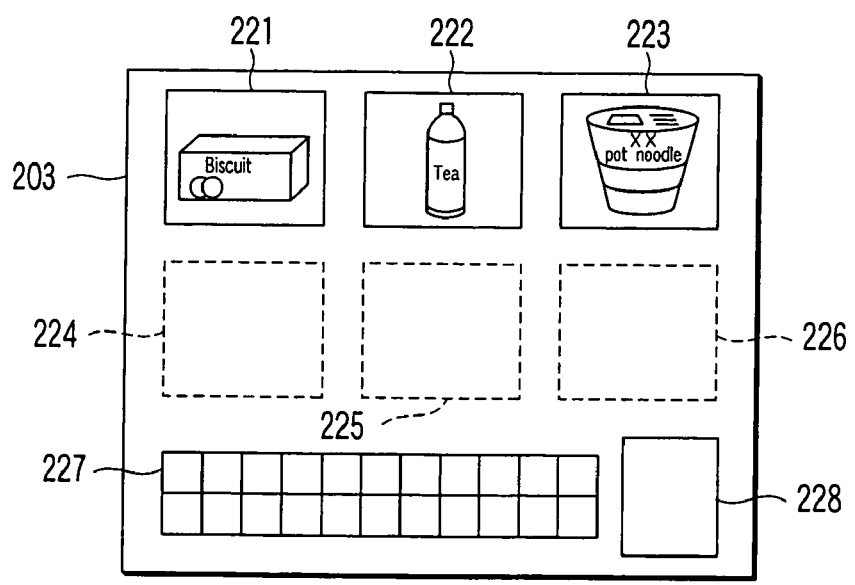
FIG. 24 is a view illustrating screen display and an input screen in the fourth embodiment.

FIG. 24 shows a screen configuration of the touch panel 203. Commodity images corresponding to commodity identifying information read by the wireless tag reading section 205 are displayed in image display frames 221 to 226. The commodity images are displayed in the commodity identifying information reading order so that a shop clerk who performs reading can immediately recognize quantities of read commodities and the commodities. Image display frames may be displayed in image display frames 224 to 226 in which no commodity image is displayed, or the image display frames may have the same background color as the screen. Furthermore, when a shop clerk touches a frame in which an image is displayed in the image display frames 221 to 226, commodity information of this image can be selected.

A display key 227 displays an image of a numeric figure or each key (a confirmation key, a registration canceling key or the like) which is frequently used during commodity registration. When a shop clerk touches a displayed key, an operation corresponding to display can be performed. When a shop clerk touches a switching key 228, an activated state/a stopped state of the barcode reading section 204 and the wireless tag reading section 205 can be switched.

FIG. 25 is a view illustrating a commodity information registering operation. A flowchart of the commodity information registration processing is the same as the processing of the flowchart of FIG. 21 described in conjunction with the third embodiment, and hence its detailed description will be eliminated. As shown in FIG. 25, commodities to be purchased by a customer are taken out from a display rack, and a basket 213 brought to a checkout counter and a basket 212 in which registered commodities are put are placed on the sacker counter 206. A wireless tag and a barcode are attached to each of commodities 114 to 116 put in the basket 213 as shown in FIG. 18B, and a barcode alone is attached to a commodity 217. Registration of commodity information can be started by operating the touch panel 203 or by operating the keyboard 202 provided to the register 201. When the operation of starting registration is performed from the touch panel 203, an electromagnetic wave is output from the wireless tag reading section 205. When the wireless tag enters the read range 211, the wireless tag can be read.

When a shop clerk takes out the commodities 214 to 217 from the basket 213 and the commodities 214 to 217 enter the wireless tag read range 211, the wireless tag reading device 205 communicates with the wireless tag attached to each commodity, and an image corresponding to the read commodity identifying information is displayed in each of the image display frames 221 to 223 in the touch panel 203.

The shop clerk moves the wireless tags 214 to 216 displayed in the touch panel into the basket 212 from the commodities 214 to 217. Since the commodity 217 does not have a wireless tag attached thereto, the shop clerk touches the switching key 228 in the touch panel 203. As a result, output of the electromagnetic wave from the wireless tag reading section 205 is stopped, and the barcode reading section 204 is activated. When the shop clerk causes the barcode reading section 204 to read a barcode of the commodity 217, the commodity 217 can be registered, and the commodity 217 is moved into the basket 212. Then, when the shop clerk touches the switching key 228, the operation of the barcode reading section 204 is stopped, and an electromagnetic wave is output from the wireless tag reading section 205.

When commodities to be registered still remain in the basket 213, the plurality of commodities are simultaneously registered. When there is no commodity to be registered in the basket 213, the commodity information registration processing is terminated.

Moreover, when there are a plurality of equal commodities, an image frame which is displayed in the touch panel 203 and to be selected is touched to select a commodity, and operating the display key 227 in the touch panel can select and input a numerical quantity described in conjunction with the third embodiment.

Additionally, a registered commodity can be canceled by utilizing a wireless tag attached to the commodity in the same procedure as that in the third embodiment.

According to this configuration, the shop clerk can collectively register multiple commodities when registering commodity information of the commodities each having a wireless tag attached thereto. Additionally, since the wireless tag read range and display of commodity images are provided in the same direction as seen from the shop clerk, it is possible to recognize registered commodities from a plurality of commodities in a moment. Further, in regard to a commodity which has failed to be registered for some reason, its barcode can be read. Therefore, a registration time of commodity registration can be reduced.

Furthermore, when a plurality of equal commodities exist, it is good enough to read information of one commodity alone and input the number of the equal commodities, thereby reducing the registration time.

Moreover, since the wireless tag attached to each commodity can be utilized to cancel information subjected to commodity registration, a shop clerk does not have to find a position of the barcode, and the wireless tag of a commodity which is a target of registration cancellation can be read. Therefore, an operation of canceling a registered commodity can be also rapidly performed.

It is to be noted that the database section which inquires about a commodity name, a price or commodity image information from commodity identifying information is provided in the commodity information registering apparatus in the third and the fourth embodiments, the database section may be placed in a store server or the like rather than the commodity information registering apparatus and connected through a communication network to perform communication. In this example, inquiry information including commodity identifying information is transmitted from the commodity information registering apparatus to the store server, and the store server returns a corresponding commodity name, price or commodity image information to the commodity information registering apparatus, thereby registering a commodity in the commodity information registering apparatus and displaying a commodity image.

According to the present invention, it is possible to provide the commodity information registering apparatus with which a shop clerk who reads each commodity enables simultaneous reading of a plurality commodities and a commodity which has failed to be read can be read by using another reading device.

What is claimed is:

1. A commodity sales registration processing system comprising:

a sales registering section in which sales information of a commodity is registered;
a wireless tag reading device which collectively reads tag information from wireless tags attached to respective commodities placed in a read region at fixed intervals;
retrieving means for retrieving tag information which has been previously read but is not currently read every time the tag information is collectively read by the wireless tag reading device;
first commodity sales registration processing means for acquiring sales information of a commodity from corresponding tag information and registering the acquired sales information in the sales registering section when the tag information is detected by the retrieving means;
informing means for performing an informing operation in response to detection of the corresponding tag information by the retrieving means;
inputting means for inputting information concerning a commodity for sale; and
second commodity sales registration processing means for acquiring sales information of a commodity from information input through the inputting means, and registering the acquired sales information in the sales registering section.

2. The commodity sales registration processing system according to claim 1, wherein the inputting means is a barcode reading device which reads a barcode attached to a commodity for sale, and
the second commodity sales registration processing means is means for acquiring sales information of a commodity from a barcode read by the barcode reading device and registering the acquired sales information in the sales registering section.

3. The commodity sales registration processing system according to claim 1, comprising a display device for an operator,
wherein the informing means is means for changing display contents in the display device in response to detection of corresponding tag information by the retrieving means.

4. The commodity sales registration processing system according to claim 1, further comprising an area which temporarily stores tag information of the wireless tags collectively read by the wireless tag reading device.

5. The commodity sales registration processing system according to claim 4, wherein the retrieving means checks whether an ID of the tag information stored in the area exists in the currently read tag information by the wireless tag reading device every time tag information is collectively read by the wireless tag reading device.

6. A commodity sales registration processing system comprising:
a sales registering section in which sales information of a commodity is registered;
a wireless tag reading device which collectively reads tag information from wireless tags attached to respective commodities placed in a read range at fixed intervals;
first commodity sales registration processing means for acquiring sales information of each commodity placed in the read region and registering the acquired sales information in the sales registering section based on the tag information collectively read by the wireless tag reading device;
retrieving means for retrieving tag information which has been previously read but is not currently read every time the tag information is collectively read by the wireless tag reading device;

informing means for performing an informing operation in response to detection of corresponding tag information by the retrieving means;

inputting means for inputting information concerning a commodity for sale; and second commodity sales registration processing means for acquiring sales information of a commodity from the information input through the inputting means and registering the acquired sales information in the sales registering section.

7. A commodity sales registration processing system comprising:

a sales registering section which registers sales information items on commodities;

a wireless tag reading device which reads tag information items at once from wireless tags attached to respective commodities placed in a read region at regular intervals;

retrieving means for retrieving a tag information item which has been previously read, but is not currently read, each time the tag information items are read at once by the wireless tag reading device;

first commodity sales registration processing means for acquiring, when the tag information item is retrieved by the retrieving means, the sales information item on a corresponding commodity from the retrieved tag information item, and registering the acquired sales information in the sales registering section; and informing means for performing an informing operation in response to retrieval of the tag information item by the retrieving means.

8. The commodity sales registration processing system according to claim 7, wherein the informing means displays a name of the commodity corresponding to the retrieved tag information item.

9. The commodity sales registration processing system according to claim 7, wherein the informing means displays a name of the commodity corresponding to the retrieved tag information item and a commodity read number corresponding to the number of tag information items each retrieved by the retrieving means.

10. The commodity sales registration processing system according to claim 7, wherein the informing means displays an image of the commodity corresponding to the retrieved tag information item.

11. The commodity sales registration processing system according to claim 7, further comprising:

inputting means for inputting information concerning a commodity for sale; and second commodity sales registration processing means for acquiring sales information on the commodity from the information input by the inputting means, and registering the acquired sales information in the sales registering section.

12. The commodity sales registration processing system according to claim 11, wherein the inputting means is a barcode reader which reads a barcode attached to the commodity for sale.

13. The commodity sales registration processing system according to claim 12, wherein the second commodity sales registering processing means acquires the sales information on the commodity, from the barcode read by the barcode reader, and registers the acquired sales information in the sales registering section.

14. The commodity sales registration processing system according to claim 7, further comprising an area which temporarily stores storage information of the wireless tags collectively read by the wireless tag reading device.

15. The commodity sales registration processing system according to claim 14, wherein the retrieving means checks whether an ID of the tag information stored in the area exists in the currently read tag information by the wireless tag reading device every time tag information is collectively read by the wireless tag reading device.

* * * * *